US010149042B2

(12) United States Patent
MacKay et al.

(10) Patent No.: US 10,149,042 B2
(45) Date of Patent: *Dec. 4, 2018

(54) DETECTION CIRCUIT

(71) Applicant: Cirrus Logic International Semiconductor Ltd., Edinburgh (GB)

(72) Inventors: Graeme MacKay, Dunfermline (GB); Andrew Bothwell, Dunblane (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,324

(22) Filed: Feb. 20, 2018

(65) Prior Publication Data

US 2018/0176675 A1   Jun. 21, 2018

Related U.S. Application Data

(63) Continuation of application No. 15/440,619, filed on Feb. 23, 2017, now Pat. No. 9,986,327, which is a
(Continued)

(30) Foreign Application Priority Data

Dec. 27, 2012   (GB) .................................. 1223443.1

(51) Int. Cl.
*H04R 29/00*   (2006.01)
*H02B 1/00*   (2006.01)
(Continued)

(52) U.S. Cl.
CPC ....... *H04R 1/1091* (2013.01); *G06F 11/3041* (2013.01); *G06F 11/3051* (2013.01);
(Continued)

(58) Field of Classification Search
CPC .... H04R 1/1091; H04R 29/00; H04R 29/001; H04R 5/04; H04R 2420/03; H04R 2420/05
(Continued)

(56) References Cited

U.S. PATENT DOCUMENTS 6,377,678 B1   4/2002  Longwell
8,831,234 B2 *  9/2014  Turner ................. H03K 5/1254
                                                               710/15
(Continued)

FOREIGN PATENT DOCUMENTS

EP              2487931 A2     8/2012

OTHER PUBLICATIONS

First Examination Opinion Notice of the State Intellectual Property Office of the People's Republic of China, Application No. 201380073986.9, dated Jul. 22, 2016, 5 pages.

*Primary Examiner* — Xu Mei
(74) *Attorney, Agent, or Firm* — Jackson Walker L.L.P.

(57) ABSTRACT

Circuitry detects properties of an accessory removably connected thereto via a multi-pole connector. The circuitry has first, second and third circuit terminals for coupling to respective first, second, and third poles of said connector, and has an output for providing evaluation values from which properties of the accessory may be derived. In the circuitry, first current sourcing circuitry is coupled to said first circuit terminal for providing a first current. A switch network comprises first, second, third and fourth switch network terminals, said first switch network terminal coupled to a reference potential, said second switch network terminal coupled to said second circuit terminal, and said third switch network terminal coupled to said third circuit terminal. Comparator circuitry provides a comparison signal, its first input terminal being coupled to said first circuit terminal. Second current sourcing circuitry having a monitor
(Continued)

node coupled to said second comparator input terminal and an output node coupled to said fourth switch network terminal provides a second current to said switch network. At least one of said first current sourcing circuitry and said second current-sourcing circuitry is responsive to a digital control word for varying said first or said second current. Control logic is provided for operatively controlling the state of the interconnections of said switch network, for adjusting said digital control word in response to said comparison signal until a voltage at said first circuit terminal is equal to a voltage at said monitor node, and for supplying said adjusted digital control word associated with the state of the interconnections to said output as an evaluation value.

20 Claims, 24 Drawing Sheets

Related U.S. Application Data continuation of application No. 14/653,661, filed as application No. PCT/GB2013/053295 on Dec. 13, 2013, now Pat. No. 9,609,425.

(60) Provisional application No. 61/746,273, filed on Dec. 27, 2012.

(51) Int. Cl.
*H04R 1/10* (2006.01)
*G06F 11/30* (2006.01)
*H04M 1/725* (2006.01)
*H04R 5/04* (2006.01)
*H04R 3/00* (2006.01)

(52) U.S. Cl.
CPC ..... *G06F 11/3096* (2013.01); *H04M 1/72527* (2013.01); *H04R 3/00* (2013.01); *H04R 5/04* (2013.01); *H04R 29/00* (2013.01); *H04R 1/1083* (2013.01); *H04R 2201/107* (2013.01); *H04R 2420/03* (2013.01); *H04R 2420/05* (2013.01); *H04R 2420/09* (2013.01)

(58) Field of Classification Search
USPC .............. 381/58, 123, 74, 59, 96, 81, 111; 439/577, 668; 710/15, 18
See application file for complete search history.

(56) References Cited

U.S. PATENT DOCUMENTS

| 9,060,228 | B2* | 6/2015 | Lee .................... H04R 5/04 |
| 9,084,035 | B2 | 7/2015 | Gustavsson |
| 9,591,421 | B2 | 3/2017 | Prentice et al. |
| 9,609,425 | B2 | 3/2017 | Mackay |
| 2005/0268000 | A1* | 12/2005 | Carlson ............... G06F 13/4081 710/15 |
| 2009/0179768 | A1 | 7/2009 | Sander et al. |
| 2009/0227298 | A1 | 9/2009 | Fukunaga |
| 2011/0099298 | A1 | 4/2011 | Chadbourne et al. |
| 2012/0265911 | A1 | 10/2012 | Connolly |

* cited by examiner

DETECTION CIRCUIT

This application is a continuation of U.S. Non-Provisional patent application Ser. No. 15/440619, filed Feb. 23, 2017, which is a continuation of U.S. Non-Provisional patent application Ser. No. 14/653661, filed Jun. 18, 2015, which is a 371 application of International Application No. PCT/GB2013/053295, filed Dec. 13, 2013, which claims priority to U.S. Provisional patent application Ser. No. 61/746273, filed Dec. 27, 2012, and United Kingdom Patent Application No. 1223443.1, filed Dec. 27, 2012, each of which is incorporated by reference herein in its entirety.

This invention relates to a detection circuit and in particular to a circuit for detecting properties of a device to which the circuit is connected.

It is known to provide electronic devices, such as mobile phones, tablet computers, recorded music playback devices and the like, with accessory devices such as headphones.

In many cases, an accessory device will be supplied with the electronic device, and so there should be no problems of mutual compatibility. However, in the case of accessory devices such as headphones, a user may wish to use a single accessory device with multiple electronic devices or diverse accessories with a given electronic device, and it is then necessary to ensure that each electronic device is operably compatible with the accessory currently connected.

Many headphones are provided with a four-conductor, i.e. four-pole, plug, which can be inserted into a four-conductor, i.e. four-pole, socket in the electronic device. Typically, two of the plug conductors will be connected to the respective speakers in the headset in order to provide stereo sound. Of the other two conductors, one will be connected to a microphone in the headset, while the other will be connected to ground. However, different headsets have microphones with different polarities. That is, the microphone and ground connections are provided on different poles of the plug. Some headsets may not include a microphone, in which case two of the plug conductors may be shorted together, or a three-conductor plug may be inserted into the four-conductor socket.

In order for the electronic device and the headset to operate successfully, it is necessary for the electronic device to recognise the presence and position of the microphone pole on the plug.

In addition, the impedance of the speakers will vary from one headset to another. For example some headsets have 8Ω speakers while others have 16Ω or 32Ω speakers, and indeed other impedances are also known to be used.

It is advantageous for the electronic device that is driving the speakers to adapt the driving signals or the operation of the driving circuitry based on the impedance of the speakers, and so, for this to be possible, it is necessary for the electronic device to detect the impedance of the speakers.

According to a first aspect of the present invention, there is provided circuitry for detecting properties of an accessory removably connected thereto via a multi-pole connector, the circuitry comprising:
- first, second and third circuit terminals for coupling to respective first, second, and third poles of said connector;
- an output for providing evaluation values from which properties of the accessory may be derived;
- first current sourcing circuitry coupled to said first circuit terminal for providing a first current;
- a switch network comprising first, second, third and fourth switch network terminals, said first switch network terminal coupled to a reference potential, said second switch network terminal coupled to said second circuit terminal, said third switch network terminal coupled to said third circuit terminal;
- comparator circuitry comprising first and second input terminals for providing a comparison signal, said first input terminal being coupled to said first circuit terminal;
- second current sourcing circuitry having a monitor node coupled to said second comparator input terminal and an output node coupled to said fourth switch network terminal for providing a second current to said switch network;
- at least one of said first current sourcing circuitry and said second current-sourcing circuitry being responsive to a digital control word for varying said first or said second current; and
- control logic for operatively controlling the state of the interconnections of said switch network, for adjusting said digital control word in response to said comparison signal until a voltage at said first circuit terminal is equal to a voltage at said monitor node, and for supplying said adjusted digital control word associated with the state of the interconnections to said output as an evaluation value.

According to a second aspect of the present invention, there is provided an electronic device, comprising circuitry according to the first aspect.

According to a third aspect of the present invention, there is provided a method of determining properties of an accessory by means of detecting circuitry according to the first aspect, the method comprising:
- setting said switch network to a first switch network state and adjusting said digital control word until it reaches a first evaluation value at which the voltage at said first circuit terminal is equal to said monitor voltage; and
- subsequently setting said switch network to a second switch network state that is different to said first switch network state and adjusting said digital control word until it reaches a second evaluation value at which the voltage at said first circuit terminal is equal to said monitor voltage; and
- determining said properties of the accessory based on the first and second evaluation values of the digital control word.

According to a fourth aspect of the present invention, there is provided a computer program product, comprising computer readable code for causing a control device to perform the method of the third aspect.

This has the advantage that the required detection outputs can be provided by the same circuitry so as to minimise the chip area devoted to such analogue functions, particularly so where the integrated circuit is manufactured on an advanced process which has a small minimum feature size, i.e. W/L, to allow dense digital circuitry but where analogue functions remain relatively physically large.

For a better understanding of the present invention, and to show how it may be put into effect, reference will now be made, by way of example, to the accompanying drawings, in which:—

FIG. 12c illustrates a twelfth use of the detection circuit of FIG. 5;

FIG. 13b illustrates a third use of the detection circuit of FIG. 6;

Figure 1:
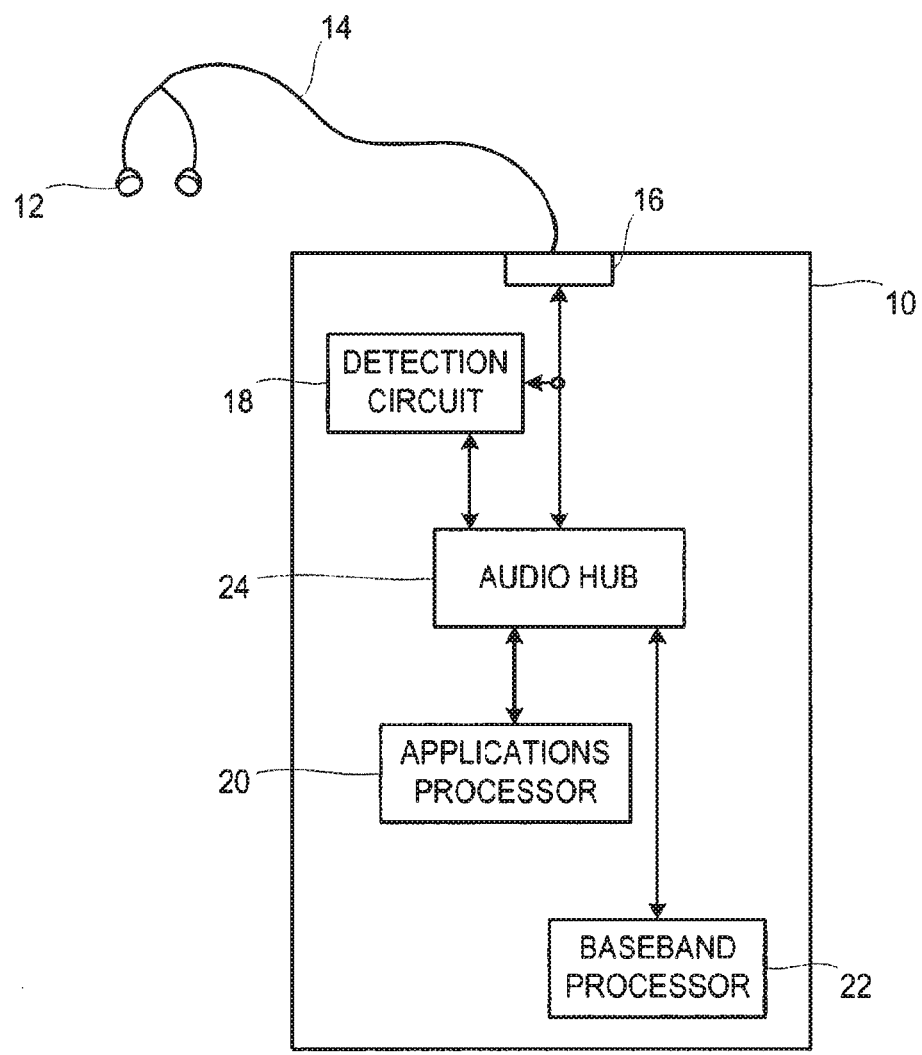
FIG. 1 illustrates a communications device in accordance with a first aspect of the invention.

FIG. 1 illustrates an electronic device 10 in accordance with an aspect of the present invention. As one example, the electronic device 10 might take the form of a communications device such as a smartphone, but it could also be a portable computing device without wireless communication facilities or be a recorded music playback device, games console or the like, or an adapter interposed between say a headset or gaming controller accessory and a communications device.

A headset 12, for example having earbuds or having in-ear or pad-on-ear headphones, can be connected to the communications device 10 by means of a cord, i.e. a plurality of isolated conductors, 14 having a jack plug (not shown in FIG. 1) that can be inserted into a jack socket 16 provided in the communications device 10. Although this invention is described herein with reference to detecting the properties of such a headset, it will be appreciated that the invention is similarly applicable to detecting the properties of other accessory devices such as line loads or docking stations or speakerphone adapters. Although this invention is described herein with reference to an accessory comprising a microphone, other electronic devices including for example media players or camcorders may provide and/or accept video on one of the poles of the jack plug, and this video line impedance in the accessory may be a property to be detected.

The jack socket 16 is connected to a detection circuit 18, which is described in more detail below. FIG. 1 shows the detection circuit being provided separately from other components, but it may be convenient for the detection circuit 18 to form part of a larger integrated circuit, for example for driving the accessory device 12.

In this illustrated embodiment, the jack socket 16, and the detection circuit 18 are also interconnected with other components of the communications device 10, such as an applications processor 20 and a baseband, i.e. communications, processor 22, as well as other components such as: a wireless modem; a built-in speaker; and/or one or more built-in microphones none of which are shown in FIG. 1, by means of an audio hub, i.e. audio codec, integrated circuit 24. The operation of these other components is conventional, and so will not be described in detail herein, except where necessary for an understanding of the present invention.

In the illustrated embodiment, the jack plug is a 3.5 mm multi-pole jack plug, and the jack socket 16 is suitable for receiving such a jack plug. A 3.5 mm multi-pole jack plug is typically provided on an accessory that includes multiple transducers such as microphones and speakers, and one terminal of each transducer is connected to a respective pole of the jack plug, with the other terminal of each transducer being connected to a common connection on the jack plug, intended to be grounded when inserted into a socket, and thus sometimes termed the ground pole of the plug.

When connecting an accessory such as a headset via a multi-pole jack to a portable device, it is advantageous to recognise what the impedance of the load (for example a speaker) is, so that the drive circuitry operation can be optimised (for example by modifying one or more parameters of the drive circuitry such as the bias current, supply voltage, charge pump or DC-DC converter clock frequency or operating mode, or maximum safety limit power level).

Also there are several varieties of connections, i.e. pole assignments, for multi-pole jacks, and it is important to recognise which pole of the jack plug is connected to the common connection and which other pole may be connected to a microphone, a speaker or video line etc., so that the appropriate ground and signal connections may be made within the electronic device.

It will be appreciated that the principle disclosed herein is applicable to other jack plugs and sockets for example, such plugs and sockets may have a different numbers of poles including 4, 5, 6, 7, or 8, and/or may have different wiring arrangements and/or various mechanical constructions.

Figure 2A:
FIGS. 2a and 2b illustrate examples of known jack conductor configurations.
Figure 2B:
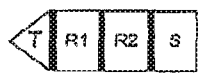

As illustrated in FIGS. 2a and 2b, a jack plug typically has a "Sleeve" conductor or pole S at the end joining the cord or cable and a pointed "Tip" conductor or pole T at the other end. There may be one or more "Ring" poles, R, R1, R2, etc. between these two. The plug of FIG. 2a may be termed a "Tip-Ring-Sleeve" or TRS plug. The plug of FIG. 2b may be termed a "Tip-Ring-Ring-Sleeve" or TRRS plug. For generality below, the poles of a jack plug, regardless of whether they are Tip, Ring, or Sleeve connections, are denoted as PP1, PP2, etc, recognising that jack connection systems are designed with multiple variants of pole order and function.

As illustrated in FIGS. 3a to 3e, these poles may be wired in many different ways to the transducers or other components of an accessory.

Figure 3A:
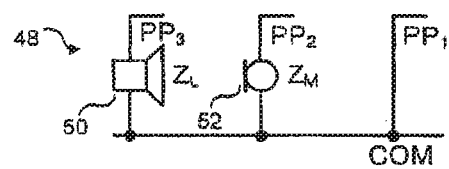
FIGS. 3a to 3e illustrate various impedance connections to the jack plug in an accessory.

FIG. 3a illustrates a jack plug with a pole PP2 wired to one terminal of a microphone 52 of impedance $Z_M$, and pole PP1 wired to one terminal of a loudspeaker coil 50 of impedance $Z_L$, with PP1 wired to the common connection of the other terminals of both of these two transducers.

Figure 3B:
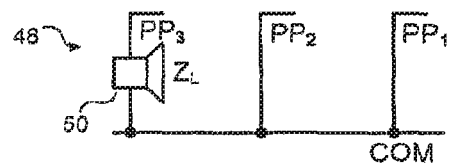

FIG. 3b illustrates a jack plug with only a speaker 50, with one terminal wired to pole PP3, and the other terminal wired to both PP1 and PP2.

Figure 3C:
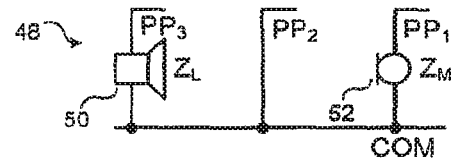

FIG. 3c illustrates a jack plug wired similarly to FIG. 3a, but with the microphone 52 wired to the physical pole chosen to be represented by PP1 rather than PP2.

Figure 3D:
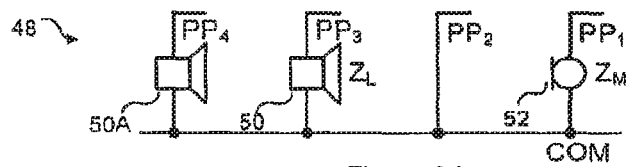

FIG. 3d shows a plug wired similarly to FIG. 3c, but with an additional pole PP4, wired to a second speaker 50A (the speakers 50, 50A perhaps being the left and right speakers of a headset).

It will be appreciated by those skilled in the art that the assignment of the poles of the jack plug have always been nothing more than design choices or commercial preferences as there is no technical effect as to how they are ordered, whether the ground pole for example is between the microphone pole and the left or right speaker pole or whether the microphone pole for example is between the ground pole and the left or right speaker pole.

Figure 3E:
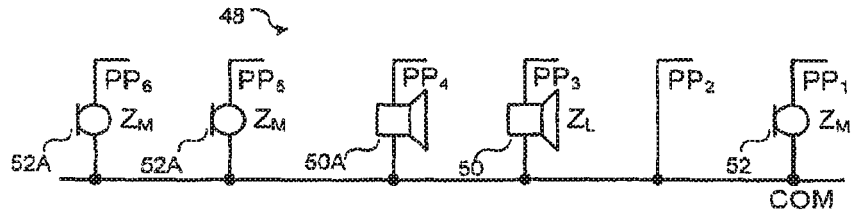

FIG. 3e illustrates a six-pole plug, wired similarly to FIG. 3d but with the extra two poles PP5 and PP6 wired to two additional microphones 52A, possibly microphones designed to pick up ambient noise for ambient noise cancellation purposes.

Many other variants of connections are known, also possibly including one or more connectors for power supply connections or for digital or video signals, and with up to at least eight poles.

While the embodiments described below refer to jack plug 48 and jack socket 16, in other embodiments connector element 48 may be a female connector and connector 16 may be a male connector. Also many mechanical variations are possible, for instance with extra projecting or cup-shaped contacts, or with pins rather than contact surfaces, especially for connectors with large numbers of poles.

Figure 4:
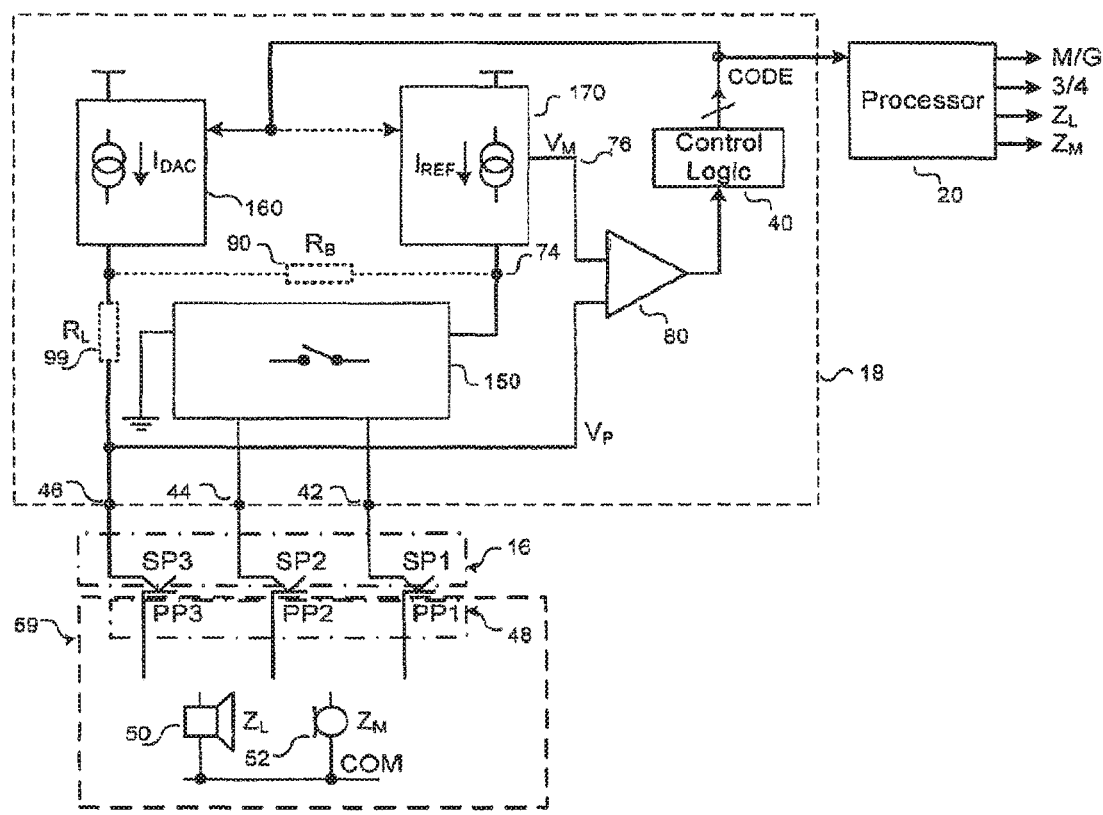
FIG. 4 illustrates the general form of a detection circuit in accordance with an aspect of the invention.

FIG. 4 illustrates features of the invention.

An accessory 59 possibly comprises a speaker 50 with an impedance $Z_L$, a microphone 52 with impedance $Z_M$, and a common, i.e. ground, connection COM. These are wired in some initially unknown fashion to poles PP1, PP2, and PP3 of a multi-pole connector, such as a jack plug. Plug poles PP1, PP2, and PP3 are mated in use with corresponding poles SP1, SP2, SP3 of a receiving connector, typically a jack socket of an electronic device such as device 10 above.

These socket poles SP1, SP2, SP3 are connected to respective terminals 42, 44, 46 of a detection circuit 18 which may also be contained in device 10. The detection circuitry 18 is designed to generate measurement data from which circuitry 20 such as a processor for example may determine the impedances and/or identify the COM connection of the inserted accessory jack plug. The processor 20 may also be contained in the device 10 or may be some other connected device. Processor 20 and some or all of detection circuitry 18 may be all or part of a single integrated circuit, or may be all or part of multiple integrated circuits.

Detection circuit 18 comprises first current sourcing circuitry 160 which is coupled to source current via terminal 46, which is also connected to one input terminal, i.e. node, of a comparator 80. The other input terminal of comparator 80 is coupled to a monitor node, i.e. terminal, 76 of second current sourcing circuitry 170, which sources current through a circuit node 74 via a switch network 150 to one or other of terminals 42, 44. The network of switches 150 may also switchably connect one or other of terminals 42, 44 to ground.

In operation, the control logic 40 digitally controls current sourcing circuitry 160 (or possibly current sourcing circuitry 170 or both) to adjust one or both sourced currents until the monitor voltage $V_M$ on terminal 76 is as equal as possible to the voltage $V_P$ on node 46, as detected by the comparator 80. The control logic word or code corresponding to this equality condition, or possibly a different but corresponding code word, is then input to circuitry 20, possibly general purpose calculation circuitry controlled by software, to derive parameters of the inserted accessory 48 on the basis of one or more measurements according to different configurations of the switch network 150.

Bleed resistor ($R_B$) 90 and limiting resistor ($R_C$) 99 are shown connected to the first current sourcing circuitry 160. These resistors ($R_B$, $R_C$) may not be present in some embodiments, with resistor 90 being replaced by an open circuit and/or resistor 99 being replaced by a short circuit. Their use is explained below.

Operation of specific embodiments is described in detail below.

Detector circuit 18 may be an integrated circuit, or part of one, in which case the terminals 42, 44, 46 may be pins or solder pads or suchlike. Alternatively, some or all of the circuit 18 may be discrete components on a printed-circuit board for example, in which case these terminals may be pins or other connectable nodes or terminals on the PCB, or may just be nodes or terminals corresponding to traces or solder pads on the PCB. For simplicity, we just refer to elements 42, 44, and 46 as terminals.

Figure 5:
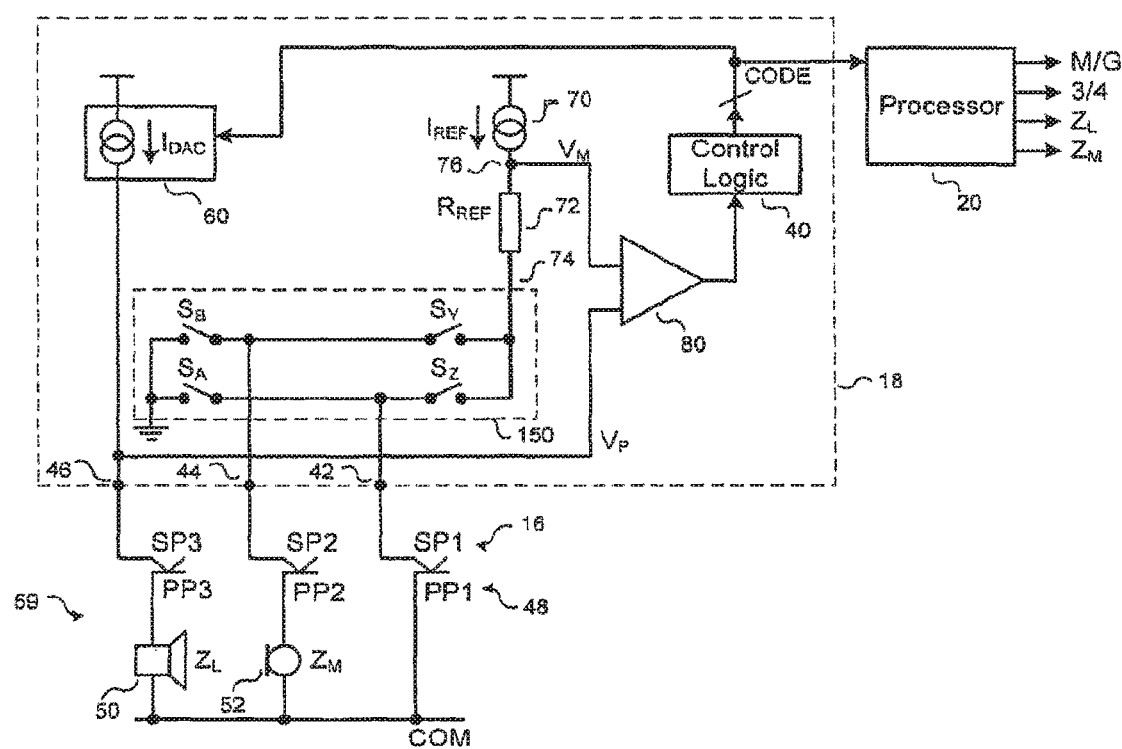
FIG. 5 illustrates a first detection circuit in accordance with the invention.

FIG. 5 shows in more detail the form of the detection circuit 18, in one embodiment.

The operation of the detection circuit 18 is controlled by a control logic block 40, which in this illustrated embodiment passes output data to a separate processor, which may for example take the form of the applications processor 20 in a smartphone. It will of course be appreciated that the processor may be provided as part of the detection circuit or vice versa.

The detection circuit 18 has three input/output terminals 42, 44, 46, which are shown connected to three poles SP1, SP2 and SP3 respectively of the jack socket 16.

FIG. 5 shows the situation where a jack plug 48 of an accessory 59 is inserted into the jack socket 16 of a device 10, and the jack plug 48 is wired in this particular embodiment such that a speaker 50 having an impedance $Z_L$ is connected to the jack plug pole PP3 and to the corresponding jack socket pole SP3, and a microphone 52 having an impedance $Z_M$ is connected to the jack plug pole PP2 and to the corresponding jack socket pole SP2, while the common connection COM is connected to the jack plug pole PP1 and to the corresponding jack socket pole SP1. However, one purpose of the detection circuit is to identify how the jack plug 48 is wired, i.e. its connectivity to impedance elements of the accessory circuitry, and so this arrangement is not known in advance when the detection circuit is used.

The detection circuit 18 includes a variable current source 60, which includes a digital-analogue converter (DAC) (not specifically shown in FIG. 5) that receives a control word from the control logic block 40, and generates a current $I_{DAC}$ in response thereto. For example, the current $I_{DAC}$ may be controllable in 1,024 steps of say 4 μA each. To avoid audio artifacts, the current source 60 may be controlled by the control logic or by internal circuitry to ensure that the current $I_{DAC}$ is digitally ramped up and down sufficiently slowly that any variations do not produce audible effects.

The variable current source 60 is coupled to the terminal 46 of the detection circuit 18.

The detection circuit 18 also includes second current sourcing circuitry comprising a fixed current source 70, which generates a current $I_{REF}$, and a resistor 72, having a resistance $R_{REF}$ which is connected between the fixed current source 70 and a node 74. The fixed current source 70 is connected to the resistor 72 at a monitor node 76.

The voltage $V_P$ at the terminal 46 is passed to a first input of a comparator 80, while the monitor voltage $V_M$ at the monitor node 76 is passed to a second input of the comparator 80. The output of the comparator 80 is passed to the control logic block 40.

The terminal 42 is switchably connectable to ground through a first switch $S_A$, and is switchably connectable to the node 74 through a second switch $S_Z$. The terminal 44 is switchably connectable to ground through a third switch $S_B$, and is switchably connectable to the node 74 through a fourth switch $S_Y$.

Opening and closing the switches $S_A$ and $S_B$ determines whether the variable current $I_{DAC}$, after passing through any load ($Z_L$) that is connected to the jack socket pole SP3, returns to ground through any load that is connected to the jack socket pole SP1 or through any load (e.g. $Z_M$) that is connected to the jack socket pole SP2.

Similarly, opening and closing the switches $S_A$, $S_Z$, $S_B$, and $S_Y$ determines whether the node 74 is connected directly to ground, or whether the current $I_{REF}$ flows to ground through any load that is connected to one of the jack socket poles SP1 or SP2. The opening and closing of the switches can be controlled by signals sent from the processor 20 or the control logic block 40, in order to ensure that the detection circuitry is operating in an intended configuration.

More specifically, four switch configurations will be described in detail, namely when one of the switches $S_A$ and $S_B$ is closed (that is, passing current) and the other is open, and when one of the switches $S_Y$ and $S_Z$ is closed (that is, passing current) and the other is open.

The voltage $V_P$ at the terminal 46 and the voltage $V_M$ at the node 76 are dependent on $I_{DAC}$ and $I_{REF}$ and on the resistor network to which these terminals are connected. In each of the four possible combinations described, the operation of the detection circuit is that the variable current $I_{DAC}$ is altered until the comparator 80 indicates that the voltage $V_P$ at the terminal 46 (on the first input of the comparator 80), is as nearly as possible equal to the voltage $V_M$ at the node 76 (on the second input of the comparator 80). The control word CODE driving the DAC within the variable current source 60 is then dependent on what load impedances are coupled to pins 42, 44 and 46, i.e. on what accessory impedances are connected to poles PP1, PP2 and PP3.

This will be described in more detail below.

Figure 6:
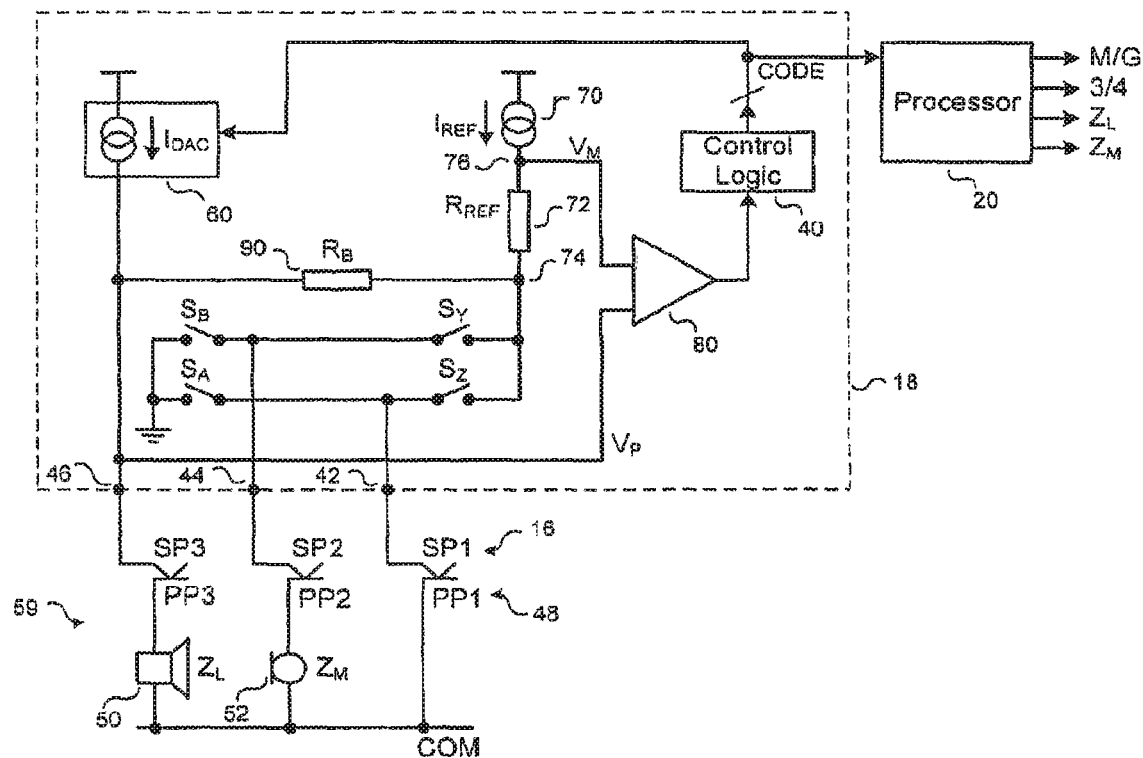
FIG. 6 illustrates a second detection circuit in accordance with the invention.

FIG. 6 shows in more detail an alternative form of the detection circuit 18, in a second embodiment. In some situations, for example if the resistance $Z_L$ is relatively high, such as would been seen with a line load (1 kΩ-10 kΩ for example) as opposed to a headphone load (4Ω-300Ω for example), the voltage at the terminal 46 may be too high for proper operation of the DAC within the variable current source 60, which is driving the load. In such a situation, it is advantageous to provide an additional bleed resistor 90, having a resistance $R_B$, say 64Ω, between the terminal 46 and the node 72. In some of the switch configurations this bleed resistor 90 appears in parallel with the load resistance $Z_L$, or in parallel with $Z_L$ which is itself in series with $Z_M$, and thus bleed resistor 90 effectively reduces the resistance seen by the variable current $I_{DAC}$.

Figure 7:
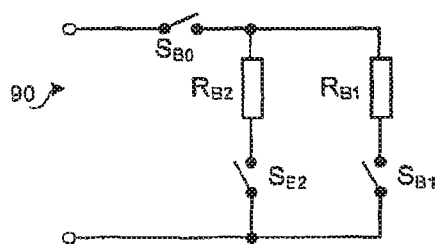
FIG. 7 illustrates switchable bleed resistances that can be used to replace the bleed resistance in the detection circuit of FIG. 6.

In a further alternative embodiment, the bleed resistor 90 may be switched in or out of the circuit, depending on the range of load impedances to be measured. Further there may be more than one such bleed resistor, and each may be switched in or out of the circuit independently, to provide a controllable bleed resistance. For example, as illustrated in FIG. 7, the bleed resistance 90 may be formed by resistors $R_{B1}$, $R_{B2}$, connectable via respective switches $S_{B1}$ and $S_{B2}$, and with a further switch $S_{B0}$ to disconnect the bleed resistance entirely. This allows the resolution and range of the measurements to be altered to suit different load impedances.

Figure 8:
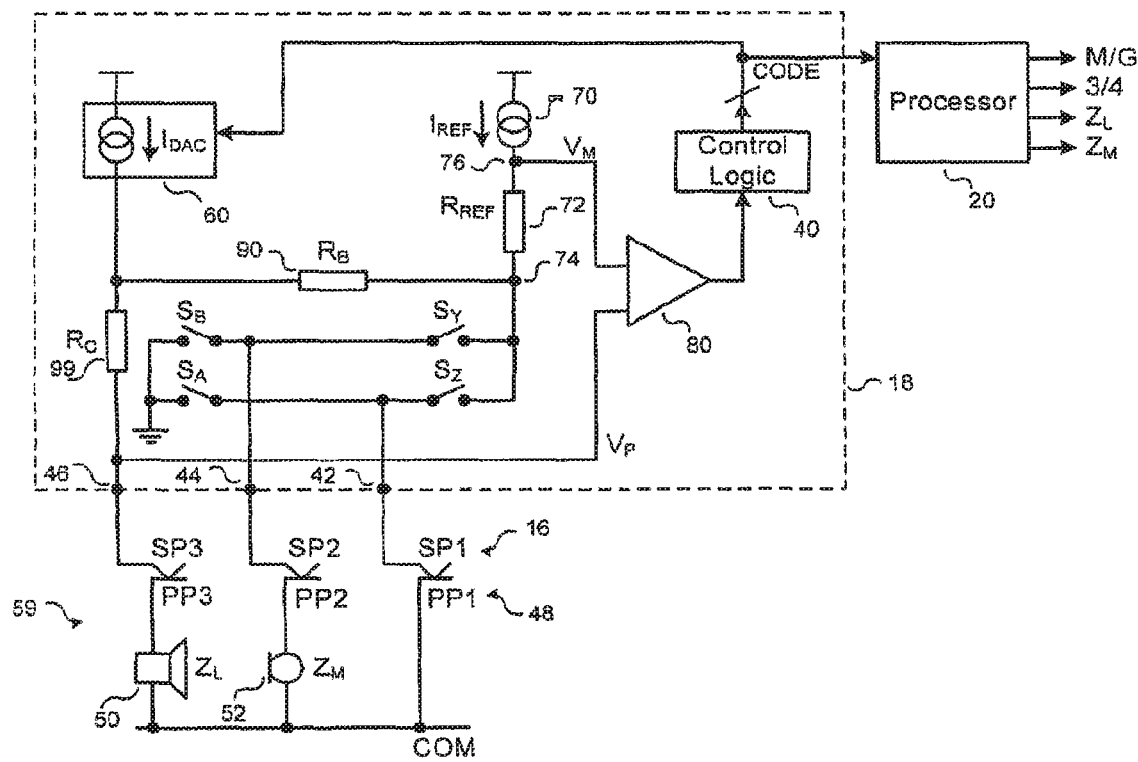
FIG. 8 illustrates a third detection circuit in accordance with the invention.

In a further alternative illustrated in FIG. 8, a limiting resistor $R_C$ say 660Ω, is added between the output of the variable current source 60 and terminal 46. If $R_C$ is greater than $R_B$, then most of the current $I_{DAC}$ will tend to flow though $R_B$ rather than $R_C$, thus reducing the current and hence the voltage drop across the load $Z_L$ attached to node 46. This allows operation over a larger range of load impedance, for example line loads of say 10 kΩ.

Figure 9:
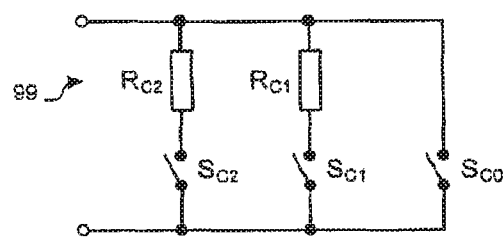
FIG. 9 illustrates switchable limiting resistances that can be used to replace the limiting resistance in the detection circuit of FIG. 8.

Resistance Rc may comprise a variable resistance, which may be varied to accommodate different ranges of load impedance. For example Rc may comprise resistors $R_{c1}$, $R_{c2}$, say 500Ω and 6 kΩ connectable via respective switches $S_{c1}$ and $S_{c2}$, or shorted by parallel switch $S_{c0}$ according to the measurement range required, as illustrated in FIG. 9.

Also, it is possible to extend the range over which measurements (for example of the load impedance $Z_L$) can be made by modulating, i.e. varying, the resistance value $R_{REF}$ or by modulating the current $I_{REF}$, for example if initial measurement implies that the load impedance is a high impedance device, such as a line-level impedance in the range of 1 kΩ to 50 kΩ.

As noted above, in operation the current $I_{DAC}$ (or possibly $I_{REF}$) is varied under control of a control word or code, CODE, generated by the control logic 40 until the voltages $V_P$ and $V_M$ on the inputs of the comparator 80 are substantially equal. The digital code may be simply ramped, i.e. counted up or down, until, or possibly also after, equality is reached, i.e. $V_P=V_M$. Alternatively an iterative search procedure may be adopted where the initial current sourced corresponds to the most significant bit of a control word, e.g. half full scale, and subsequent choices depend on the result of the previous comparison, as for example in known successive-approximation-register analogue-to-digital converters (SAR ADCs).

Figure 10A:
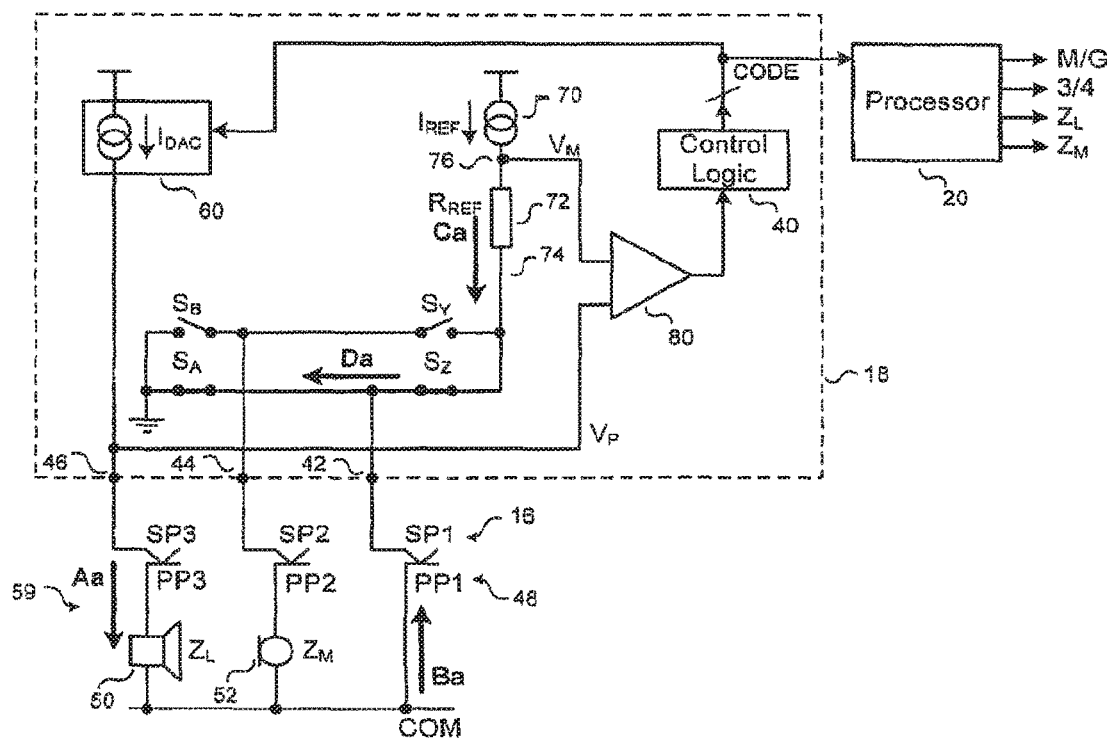
FIG. 10a illustrates a first use of the detection circuit of FIG. 5.

FIG. 10a shows the detection circuit of FIG. 5, in a first configuration, i.e. mode, with the switches $S_A$ and $S_Z$ closed and the switches $S_B$ and $S_Y$ open. FIG. 10a also shows a jack plug 48 is inserted into the jack socket 16, and the accessory 59 is wired such that a speaker 50 having an impedance $Z_L$ is connected to the jack plug pole PP3 and thence to the corresponding jack socket pole SP3, and a microphone 52 having an impedance $Z_M$ is connected to the jack plug pole PP2 and thence to the corresponding jack socket pole SP2, while the common connection COM is connected to the jack plug pole PP1 and thence to the corresponding jack socket pole SP1.

Thus, FIG. 10a shows the variable current $I_{DAC}$ passing through the load $Z_L$ (arrow Aa) and returning to ground through the pole SP1 (arrow Ba). FIG. 10a also shows the reference current $I_{REF}$ passing through the resistor 72 (arrow Ca) and then passing directly to ground (arrow Da).

In this example, equality of $V_P$ and $V_M$ is achieved at the control code CODE when $I_{DAC} \cdot Z_L = I_{REF} \cdot R_{REF}$. If $I_{DAC} = \text{CODE} \cdot I_{UNIT}$ and $I_{REF} = N_{REF} \cdot I_{UNIT}$, where $I_{UNIT}$ is the unit or least-significant-bit (LSB) current for the DAC, then $\text{CODE} = N_{REF} \cdot R_{REF}/Z_L$. For, say, a 32 Ω load, and with $R_{REF}=440\Omega$, and $N_{REF}=16$, the resulting CODE would then be 16*440/32=220.

Figure 10B:
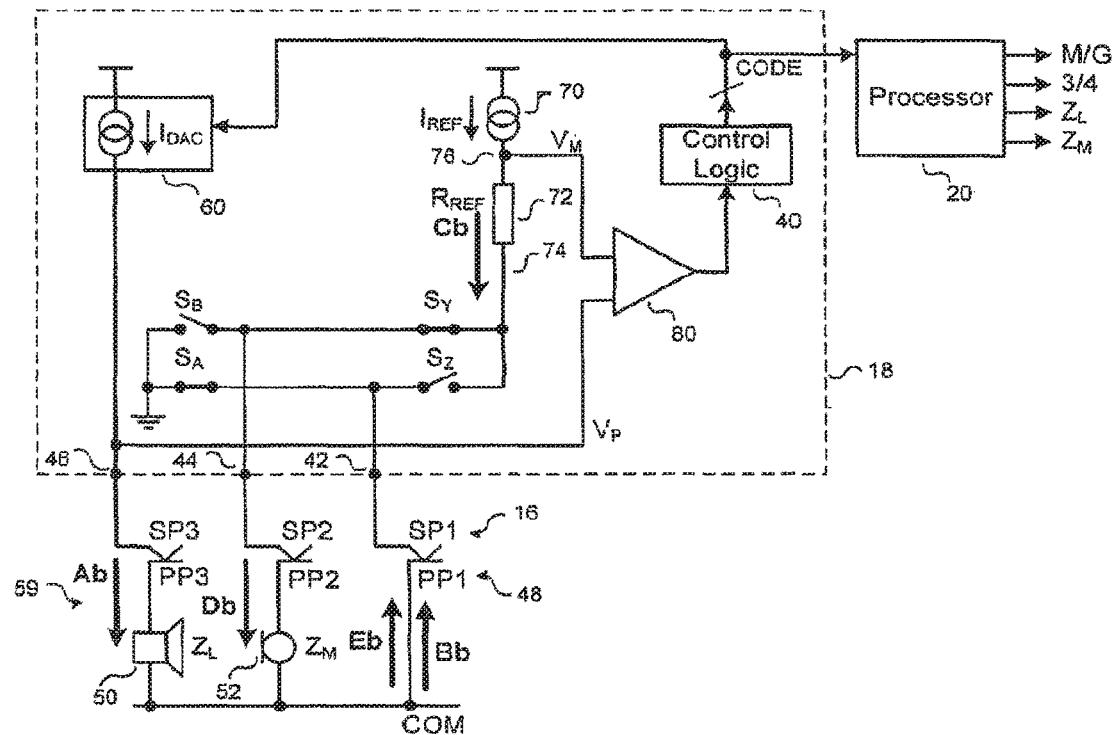
FIG. 10b illustrates a second use of the detection circuit of FIG. 5.

FIG. 10b shows the detection circuit of FIG. 5, in a second configuration, with the switches $S_A$ and $S_Y$ closed and the switches $S_B$ and $S_Z$ open. FIG. 10b shows the same jack plug as in FIG. 10a inserted into the jack socket 16.

Thus, FIG. 10b shows the variable current $I_{DAC}$ passing through the load $Z_L$ (arrow Ab) and returning to ground through the pole SP1 (arrow Bb). FIG. 10b also shows the reference current $I_{REF}$ passing through the resistor 72 (arrow Cb) and then passing to ground through the load $Z_M$ (arrow Db) and through the pole SP1 (arrow Eb).

Figure 10C:
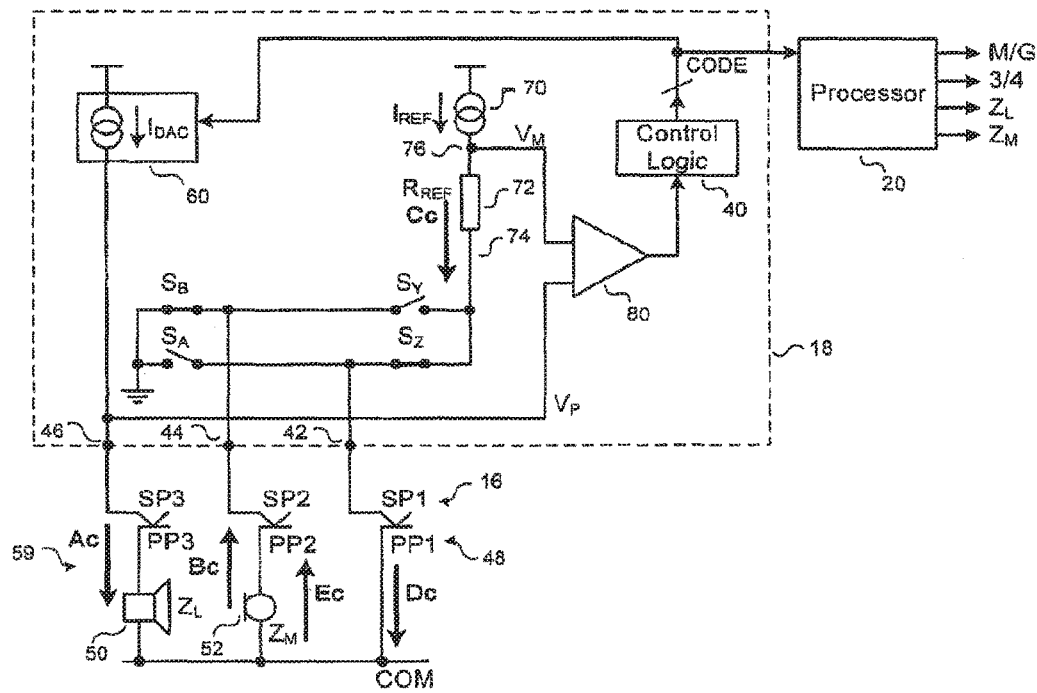
FIG. 10c illustrates a third use of the detection circuit of FIG. 5.

FIG. 10c shows the detection circuit of FIG. 5, in a third configuration, with the switches $S_B$ and $S_Z$ closed and the switches $S_A$ and $S_Y$ open. FIG. 10c shows the same jack plug as in FIG. 10a inserted into the jack socket 16.

Thus, FIG. 10c shows the variable current $I_{DAC}$ passing through the load $Z_L$ (arrow Ac) and returning to ground through the load $Z_M$ and pole SP2 (arrow Bc). FIG. 10c also shows the reference current $I_{REF}$ passing through the resistor 72 (arrow Cc) and then passing to ground through the pole SP1 (arrow Dc) and through the load $Z_M$ (arrow Ec) and the pole SP2.

Figure 10D:
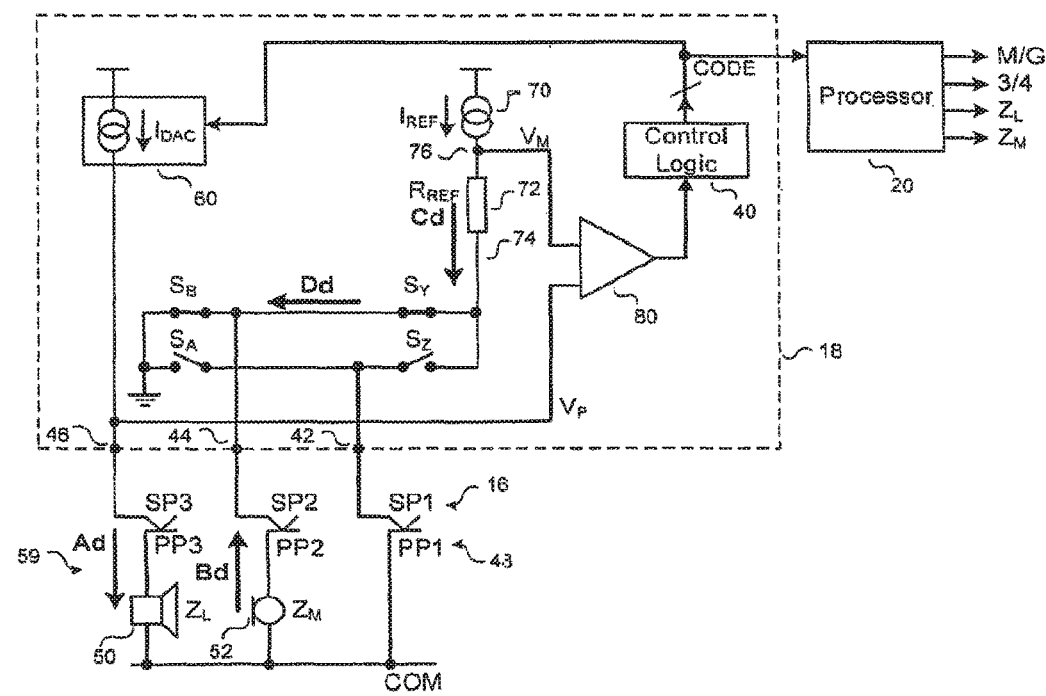
FIG. 10d illustrates a fourth use of the detection circuit of FIG. 5.

FIG. 10d shows the detection circuit of FIG. 5, in a fourth configuration, with the switches $S_B$ and $S_Y$ closed and the switches $S_A$ and $S_Z$ open. FIG. 10d shows the same jack plug as in FIG. 10a inserted into the jack socket 16.

Thus, FIG. 10d shows the variable current $I_{DAC}$ passing through the load $Z_L$ (arrow Ad) and returning to ground through the load $Z_M$ and pole SP2 (arrow Bd). FIG. 10d also shows the reference current $I_{REF}$ passing through the resistor 72 (arrow Cd) and then passing directly to ground (arrow Dd).

The following table shows equations for the voltage $V_P$ on the terminal 46, and the voltage $V_M$ on the node 76, derived by inspection for each of the four configurations described above. As described previously, the variable current $I_{DAC}$ is controlled such that the voltages $V_P$ and $V_M$ are substantially equal. Thus, the final column in the table, headed CODE, contains the value of CODE then output, from one or more measurements of which, based on knowledge of $R_{REF}$ and $N_{REF}$, the unknown load impedance $Z_L$ or $Z_M$ can be calculated.

| $S_A$ | $S_B$ | $S_Z$ | $S_Y$ | $V_P$ | $V_M$ | CODE |
|---|---|---|---|---|---|---|
| ✓ |  | ✓ |  | $I_{DAC} \cdot Z_L$ | $I_{REF} \cdot R_{REF}$ | $N_{REF} \cdot R_{REF}/Z_L$ |
| ✓ |  |  | ✓ | $I_{DAC} \cdot Z_L$ | $I_{REF} \cdot (R_{REF}+Z_M)$ | $N_{REF} \cdot (R_{REF}+Z_M)/Z_L$ |
|  | ✓ | ✓ |  | $I_{DAC} \cdot Z_L + (I_{DAC}+I_{REF}) \cdot Z_M$ | $I_{REF} \cdot R_{REF} + (I_{DAC}+I_{REF}) \cdot Z_M$ | $N_{REF} \cdot R_{REF}/Z_L$ |
|  | ✓ |  | ✓ | $I_{DAC} \cdot (Z_L+Z_M)$ | $I_{REF} \cdot R_{REF}$ | $N_{REF} \cdot R_{REF}/(Z_L+Z_M)$ |

Figure 11A:
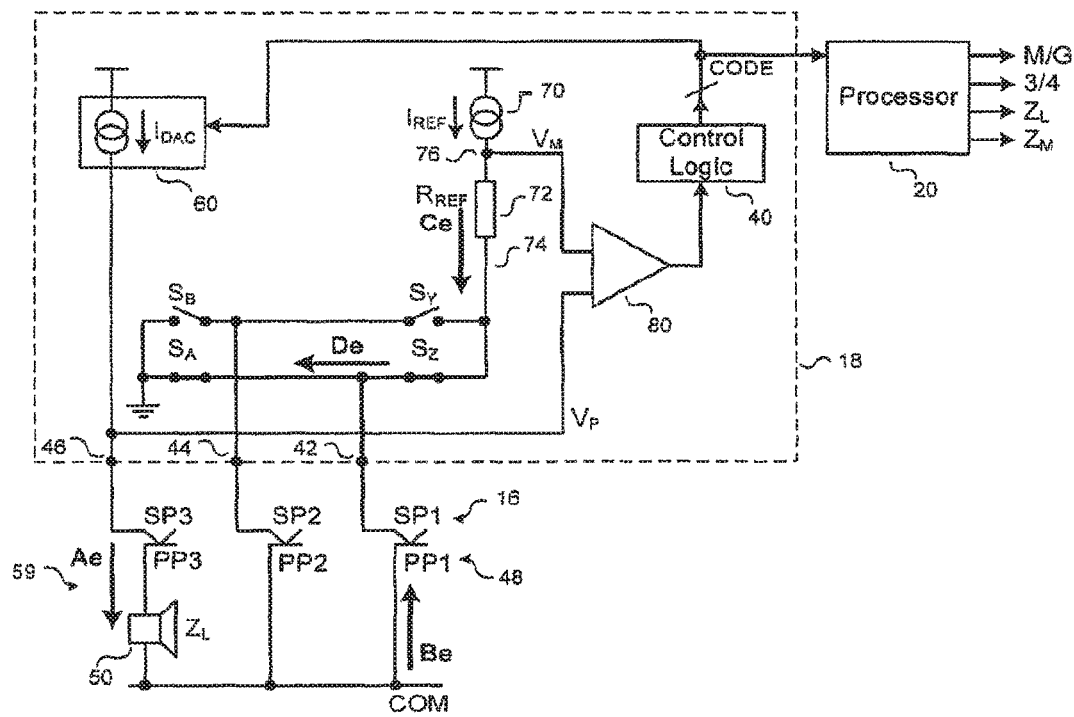
FIG. 11a illustrates a fifth use of the detection circuit of FIG. 5.

FIG. 11a shows the detection circuit of FIG. 5, in the first configuration, i.e. mode, with the switches $S_A$ and $S_Z$ closed and the switches $S_B$ and $S_Y$ open. FIG. 11a also shows a jack plug 48 inserted into the jack socket 16, and the accessory 59 is wired such that a speaker 50 having an impedance $Z_L$ is connected to the jack plug pole PP3 and thence to the corresponding jack socket pole SP3, while the jack plug poles PP1 and PP2 are both connected to a common connection (which typically arises when the jack plug 48 is a three-pole plug) and thence to the corresponding jack socket poles SP2 and SP1.

Thus, FIG. 11a shows the variable current $I_{DAC}$ passing through the load $Z_L$ (arrow Ae) and returning to ground through the pole SP1 (arrow Be). FIG. 11a also shows the reference current $I_{REF}$ passing through the resistor 72 (arrow Ce) and then passing directly to ground (arrow De).

Figure 11B:
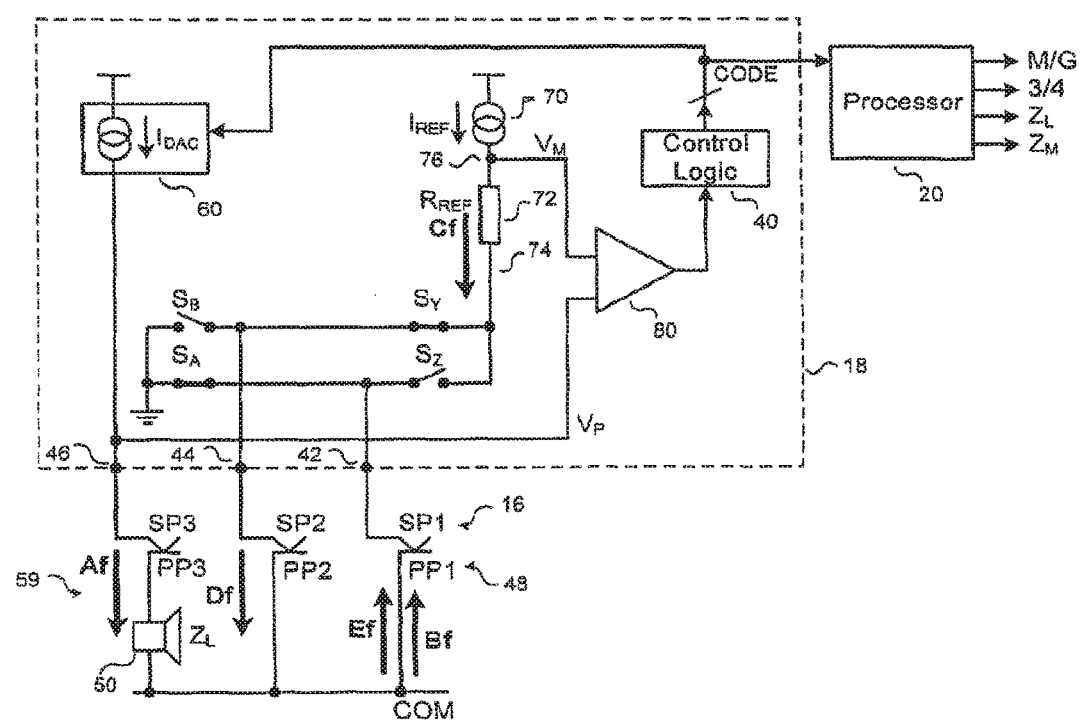
FIG. 11b illustrates a sixth use of the detection circuit of FIG. 5.

FIG. 11b shows the detection circuit of FIG. 5, in the second configuration, with the switches $S_A$ and $S_Y$ closed and the switches $S_B$ and $S_Z$ open. FIG. 11b shows the same jack plug as in FIG. 11a inserted into the jack socket 16.

Thus, FIG. 11b shows the variable current $I_{DAC}$ passing through the load $Z_L$ (arrow Af) and returning to ground through the pole SP1 (arrow Bf). FIG. 11b also shows the reference current $I_{REF}$ passing through the resistor 72 (arrow Cf) and then passing to ground through the pole SP2 (arrow Df) and through the pole SP1 (arrow Ef).

Figure 11C:
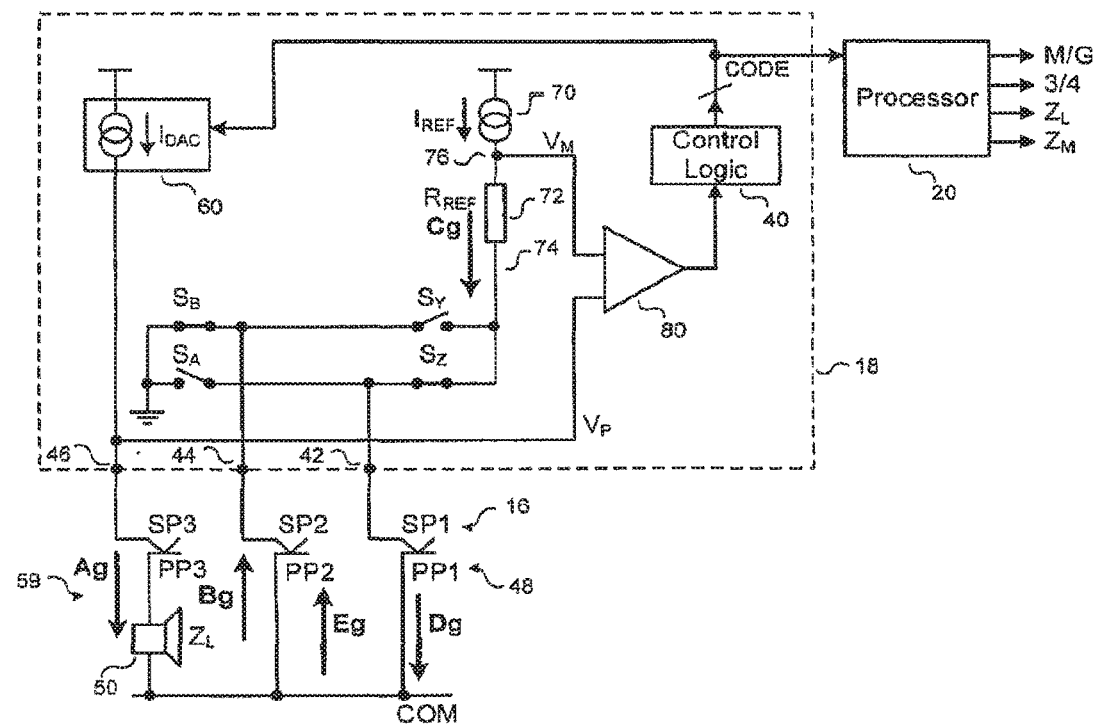
FIG. 11c illustrates a seventh use of the detection circuit of FIG. 5.

FIG. 11c shows the detection circuit of FIG. 5, in the third configuration, with the switches $S_B$ and $S_Z$ closed and the switches $S_A$ and $S_Y$ open. FIG. 11c shows the same jack plug as in FIG. 11a inserted into the jack socket 16.

Thus, FIG. 11c shows the variable current $I_{DAC}$ passing through the load $Z_L$ (arrow Ag) and returning to ground through the pole SP2 (arrow Bg). FIG. 11c also shows the reference current $I_{RE}$ passing through the resistor 72 (arrow Cg) and then passing to ground through the pole SP1 (arrow Dg) and the pole SP2 (arrow Eg).

Figure 11D:
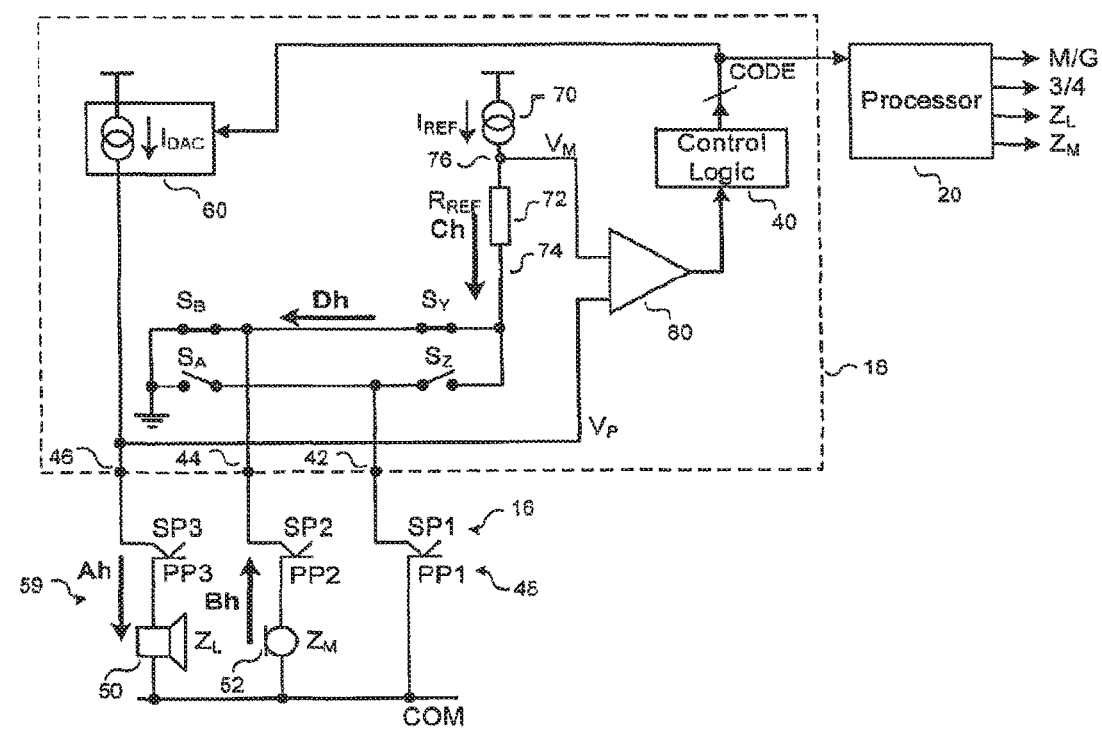
FIG. 11d illustrates an eighth use of the detection circuit of FIG. 5.

FIG. 11d shows the detection circuit of FIG. 5, in the fourth configuration, with the switches $S_B$ and $S_Y$ closed and the switches $S_A$ and $S_Z$ open. FIG. 11d shows the same jack plug as in FIG. 11a inserted into the jack socket 16.

Thus, FIG. 11d shows the variable current $I_{DAC}$ passing through the load $Z_L$ (arrow Ah) and returning to ground through the pole SP2 (arrow Bh). FIG. 11d also shows the reference current $I_{REF}$ passing through the resistor 72 (arrow Ch) and then passing directly to ground (arrow Dh).

The following table shows the voltage $V_P$ on the terminal 46, and the voltage $V_M$ on the node 76, in each of the four configurations described above. As described previously, the variable current $I_{DAC}$ is controlled such that the voltages $V_P$ and $V_M$ are substantially equal. The final column in the table, headed CODE, is the code required to control the DAC to provide this equality. It will be noted that all four switch configurations give the same voltages and output CODE. From this code, and knowledge of $R_{REF}$ and $N_{REF}$, $Z_L$ may be calculated.

| $S_A$ | $S_B$ | $S_Z$ | $S_Y$ | $V_P$ | $V_M$ | CODE |
|---|---|---|---|---|---|---|
| ✓ |   |   | ✓ | $I_{DAC} \cdot Z_L$ | $I_{REF} \cdot R_{REF}$ | $N_{REF} \cdot R_{REF}/Z_L$ |
| ✓ |   |   | ✓ | $I_{DAC} \cdot Z_L$ | $I_{REF} \cdot R_{REF}$ | $N_{REF} \cdot R_{REF}/Z_L$ |
|   | ✓ | ✓ |   | $I_{DAC} \cdot Z_L$ | $I_{REF} \cdot R_{REF}$ | $N_{REF} \cdot R_{REF}/Z_L$ |
|   | ✓ |   | ✓ | $I_{DAC} \cdot Z_L$ | $I_{REF} \cdot R_{REF}$ | $N_{REF} \cdot R_{REF}/Z_L$ |

Figure 12A:
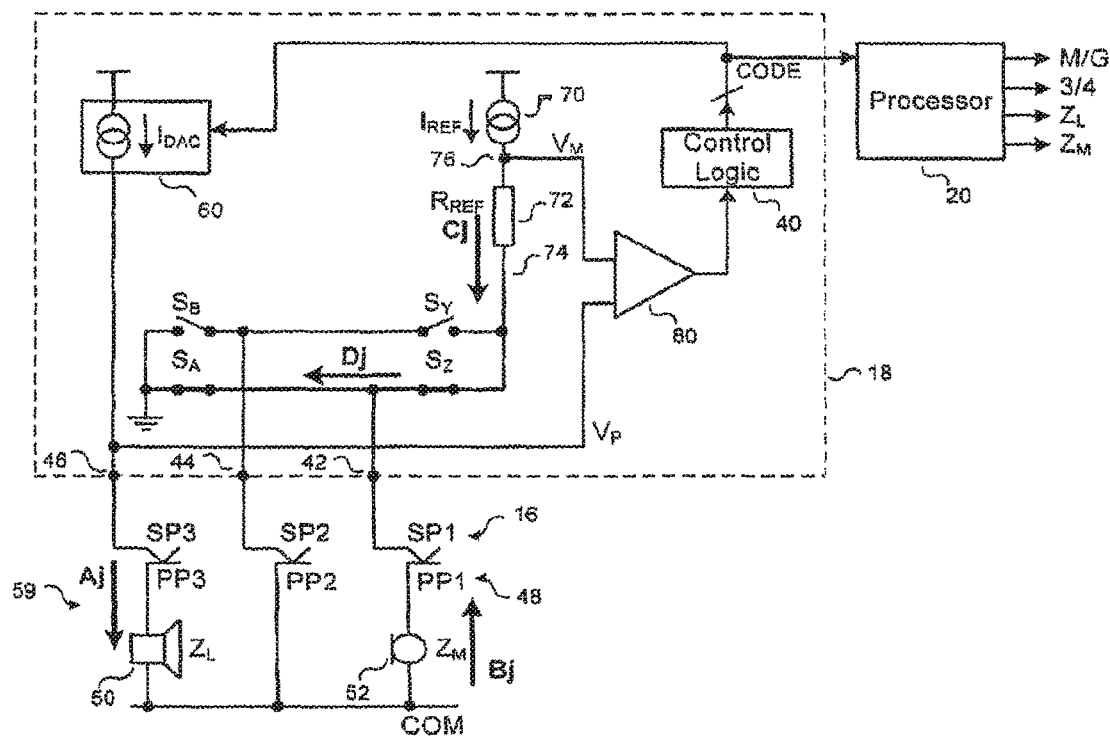
FIG. 12a illustrates a ninth use of the detection circuit of FIG. 5.

FIG. 12a shows the detection circuit of FIG. 5, in the first configuration, i.e. mode, with the switches $S_A$ and $S_Z$ closed and the switches $S_B$ and $S_Y$ open. FIG. 12a also shows a jack plug 48 inserted into the jack socket 16, and the accessory 59 is wired such that a speaker 50 having an impedance $Z_L$ is connected to the jack plug pole PP3 and thence to the corresponding jack socket pole SP3. In this case, the jack plug 48 is wired such that a microphone 52 having an impedance $Z_M$ is connected to the jack plug pole PP1 and thence to the corresponding jack socket pole SP1, while the common connection COM is connected to the jack plug pole PP2 and thence to the corresponding jack socket pole SP2.

Thus, FIG. 12a shows the variable current $I_{DAC}$ passing through the load $Z_L$ (arrow Aj) and returning to ground through the load $Z_M$ and pole SP1 (arrow Bj). FIG. 12a also shows the reference current $I_{REF}$ passing through the resistor 72 (arrow Cj) and then passing directly to ground (arrow Dj).

Figure 12B:
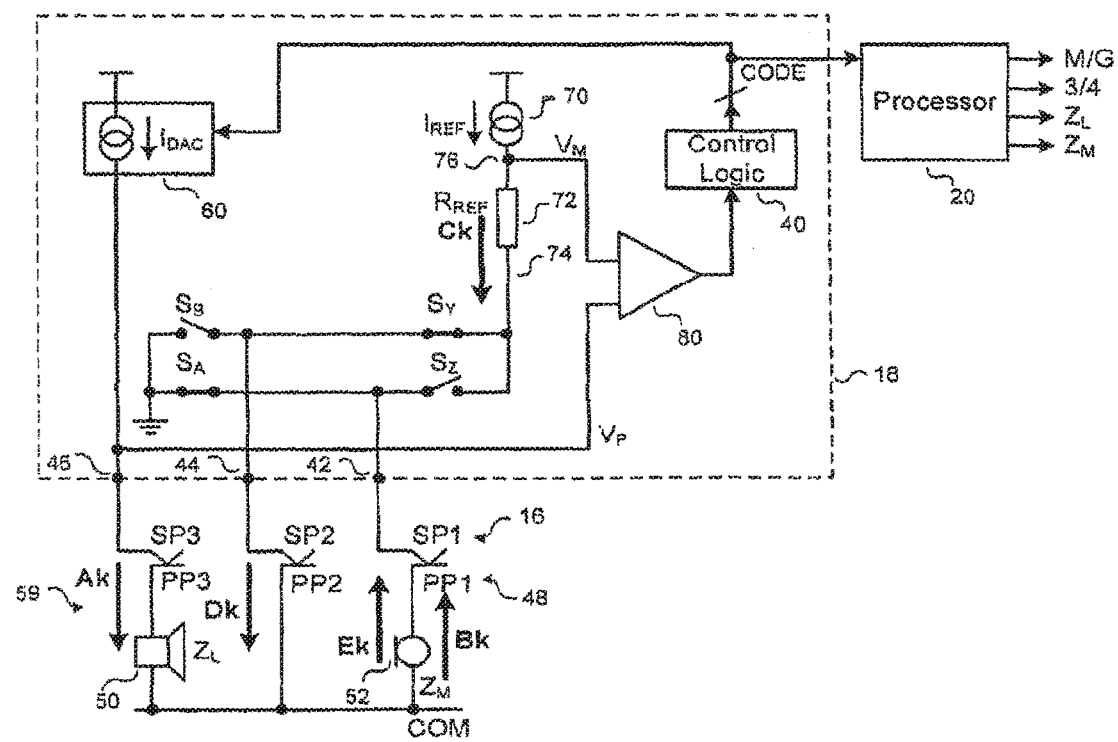
FIG. 12b illustrates a tenth use of the detection circuit of FIG. 5.

FIG. 12b shows the detection circuit of FIG. 5, in the second configuration, with the switches $S_A$ and $S_Y$ closed and the switches $S_B$ and $S_Z$ open. FIG. 12b shows the same jack plug as in FIG. 12a inserted into the jack socket 16.

Thus, FIG. 12b shows the variable current $I_{DAC}$ passing through the load $Z_L$ (arrow Ak) and returning to ground through the load $Z_M$ and pole SP1 (arrow Bk). FIG. 12b also shows the reference current $I_{REF}$ passing through the resistor 72 (arrow Ck) and then passing to ground through the pole SP2 (arrow Dk) and through the load $Z_M$ and the pole SP1 (arrow Ek).

Figure 12C:
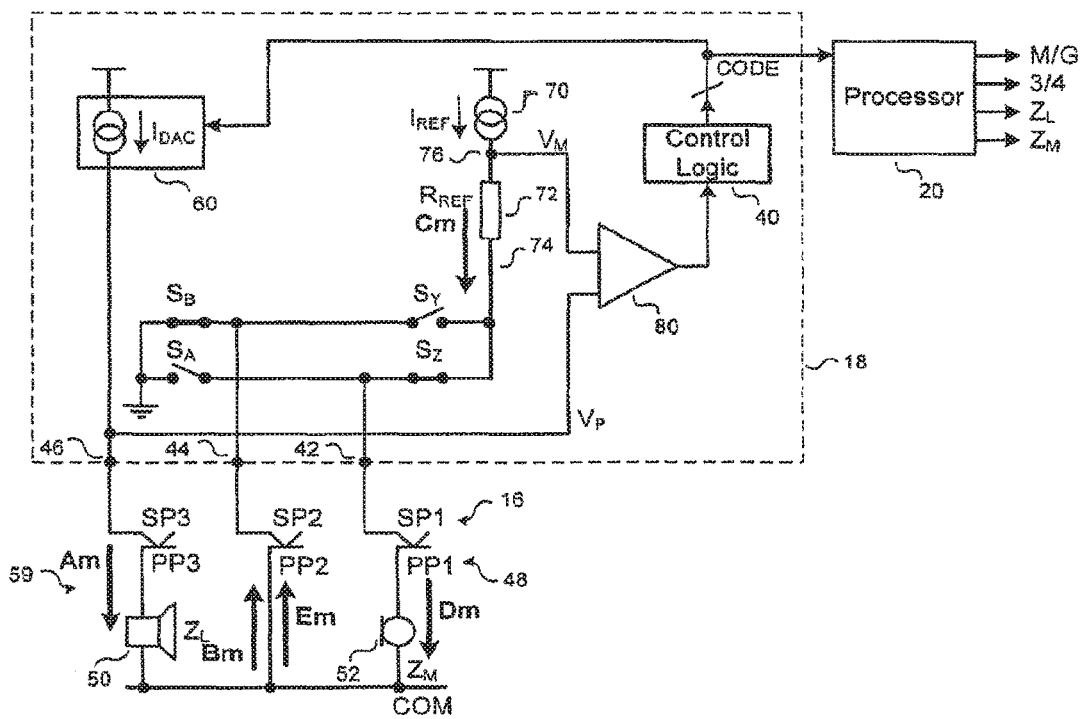
FIG. 12c illustrates an eleventh use of the detection circuit of FIG. 5.

FIG. 12c shows the detection circuit of FIG. 5, in the third configuration, with the switches $S_B$ and $S_Z$ closed and the switches $S_A$ and $S_Y$ open. FIG. 12c shows the same jack plug as in FIG. 12a inserted into the jack socket 16.

Thus, FIG. 12c shows the variable current $I_{DAC}$ passing through the load $Z_L$ (arrow Am) and returning to ground through the pole SP2 (arrow Bm). FIG. 12c also shows the reference current $I_{REF}$ passing through the resistor 72 (arrow Cm) and then passing to ground through the pole SP1 and the load $Z_M$ (arrow Dm) and the pole SP2 (arrow Em).

Figure 12D:
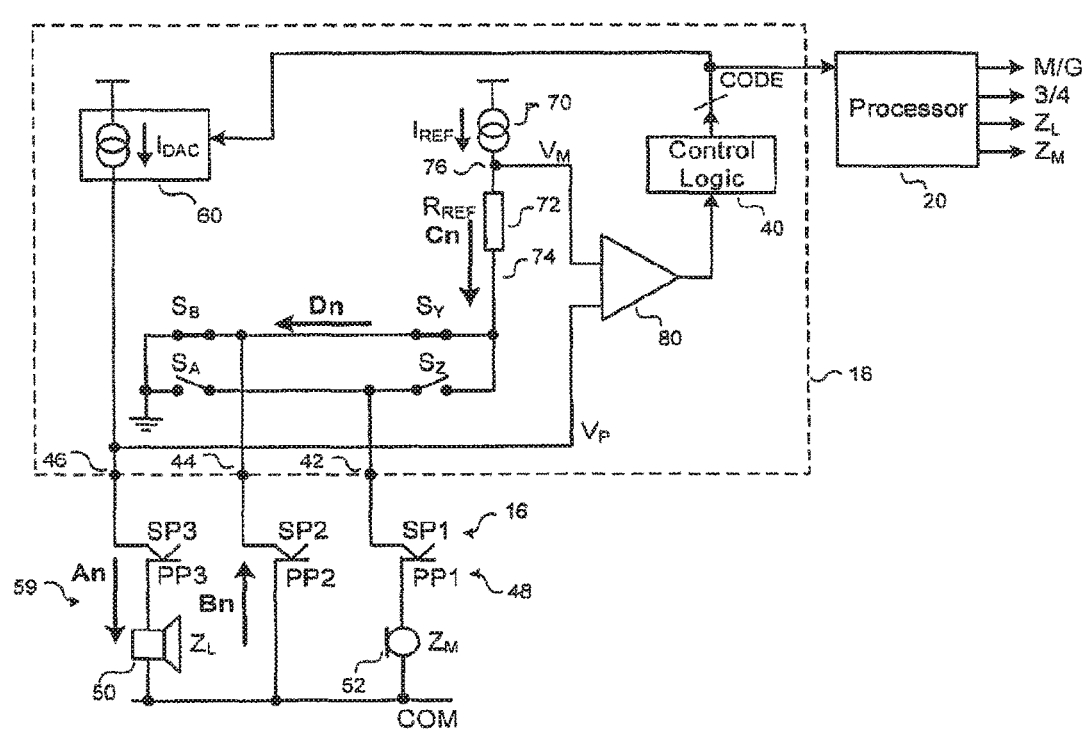

FIG. 12d shows the detection circuit of FIG. 5, in the fourth configuration, with the switches $S_B$ and $S_Y$ closed and the switches $S_A$ and $S_Z$ open. FIG. 12d shows the same jack plug as in FIG. 12a inserted into the jack socket 16.

Thus, FIG. 12d shows the variable current $I_{DAC}$ passing through the load $Z_L$ (arrow An) and returning to ground through the pole SP2 (arrow Bn). FIG. 12d also shows the reference current $I_{REF}$ passing through the resistor 72 (arrow Cn) and then passing directly to ground (arrow Dn).

The following table shows the voltage $V_P$ on the terminal 46, and the voltage $V_M$ on the node 76, in each of the four configurations described above. As described previously, the variable current $I_{DAC}$ is controlled such that the voltages $V_P$ and $V_M$ are substantially equal. The final column in the table, headed CODE, is the code required to control the DAC to provide this equality. From one or more of these codes and knowledge of $R_{REF}$ and $N_{REF}$, $Z_L$ and $Z_M$ may be calculated.

| $S_A$ | $S_B$ | $S_Z$ | $S_Y$ | $V_P$ | $V_M$ | CODE |
|---|---|---|---|---|---|---|
| ✓ |   |   | ✓ | $I_{DAC} \cdot (Z_L + Z_M)$ | $I_{REF} \cdot R_{REF}$ | $N_{REF} \cdot R_{REF}/(Z_L + Z_M)$ |
| ✓ |   |   | ✓ | $I_{DAC} \cdot Z_L + (I_{DAC} + I_{REF}) \cdot Z_M$ | $I_{REF} \cdot R_{REF} + (I_{DAC} + I_{REF}) \cdot Z_M$ | $N_{REF} \cdot R_{REF}/Z_L$ |
|   | ✓ | ✓ |   | $I_{DAC} \cdot Z_L$ | $I_{REF} \cdot (R_{REF} + Z_M)$ | $N_{REF} \cdot (R_{REF} + Z_M)/Z_L$ |
|   | ✓ |   | ✓ | $I_{DAC} \cdot Z_L$ | $I_{REF} \cdot R_{REF}$ | $N_{REF} \cdot R_{REF}/Z_L$ |

Summarising the above results, it can be seen that each combination may provide one of three results for the code as shown in the table below.

| $S_A$ | $S_B$ | $S_Z$ | $S_Y$ | Jack Plug of Figures 10a-10d | Jack Plug of Figures 11a-11d | Jack Plug of Figures 12a-12d |
|---|---|---|---|---|---|---|
|   |   |   |   | PP1 = SP1 = COM<br>PP2 = SP2 = $Z_M$ | PP1 = SP1 = COM<br>PP2 = SP2 = COM | PP1 = SP1 = $Z_M$<br>PP2 = SP2 = COM |
| ✓ |   |   | ✓ | $N_{REF} \cdot R_{REF}/Z_L$ | $N_{REF} \cdot R_{REF}/Z_L$ | $N_{REF} \cdot R_{REF}/(Z_L + Z_M)$ |
| ✓ |   |   | ✓ | $N_{REF} \cdot (R_{REF} + Z_M)/Z_L$ | $N_{REF} \cdot R_{REF}/Z_L$ | $N_{REF} \cdot R_{REF}/Z_L$ |
|   | ✓ | ✓ |   | $N_{REF} \cdot R_{REF}/Z_L$ | $N_{REF} \cdot R_{REF}/Z_L$ | $N_{REF} \cdot (R_{REF} + Z_M)/Z_L$ |
|   | ✓ |   | ✓ | $N_{REF} \cdot R_{REF}/(Z_L + Z_M)$ | $N_{REF} \cdot R_{REF}/Z_L$ | $N_{REF} \cdot R_{REF}/Z_L$ |

At least two out of each of the four measurements produce a code value $N_{REF} \cdot R_{REF}/Z_L$, whereas another measurement may produce a large code value $N_{REF} \cdot (R_{REF} + Z_M)/Z_L$ or a smaller code value $N_{REF} \cdot R_{REF}/(Z_L + Z_M)$. Thus, by performing at least two measurements of the possible four, the speaker and microphone impedances and the common-connection pole may be easily identified by simple calculations in a processor for example. The measurements may alternatively be compared to values that have been previously determined, based on usage scenarios for given accessories and their respective configurations and whose code values are stored in a look-up-table (LUT).

For all embodiments described the processing circuitry 20 may also apply any de-bounce or noise or spike filtering that is necessary, given the small size of the signal voltages. For instance simple averaging or median filtering could be applied, or the processor 20 could wait for a given number of stable readings.

In some cases the required CODE may exceed the available range, i.e. the output code may be clipped either at zero or at the maximum code. While the impedance value obtained may not then be accurate, the comparison results may still be valid and used for example to determine the COM connection pole or poles.

Thus, the drive circuitry operation can be optimised (for example to optimise one or more parameter such as the bias current, supply voltage, charge pump or DC-DC converter clock frequency or operational mode, or maximum safe power level etc.) based on the detected impedance value of the speaker 50. Also, the appropriate ground and signal connections may be made in the portable device, based on the determination as to which pole of the jack plug is connected to the common connection COM and which other pole is connected to a non-zero impedance $Z_M$ of a microphone or other transducer.

In some cases the voltage developed at $V_P$ or $V_M$ may be inconveniently large or small. This can be mitigated by choosing an alternative one of the four switch configurations.

As mentioned above, FIG. 6 shows an alternative embodiment, in which an additional resistor 90, having resistance $R_B$, is provided to reduce the maximum value of the voltage applied to the first input of the comparator 80. Again, there are four possible configurations of the switches $S_A$, $S_B$, $S_Y$ and $S_Z$ and the measurements made can be used to determine the load resistance $Z_L$ and identify the wiring of the jack plug 48.

Figure 13A:
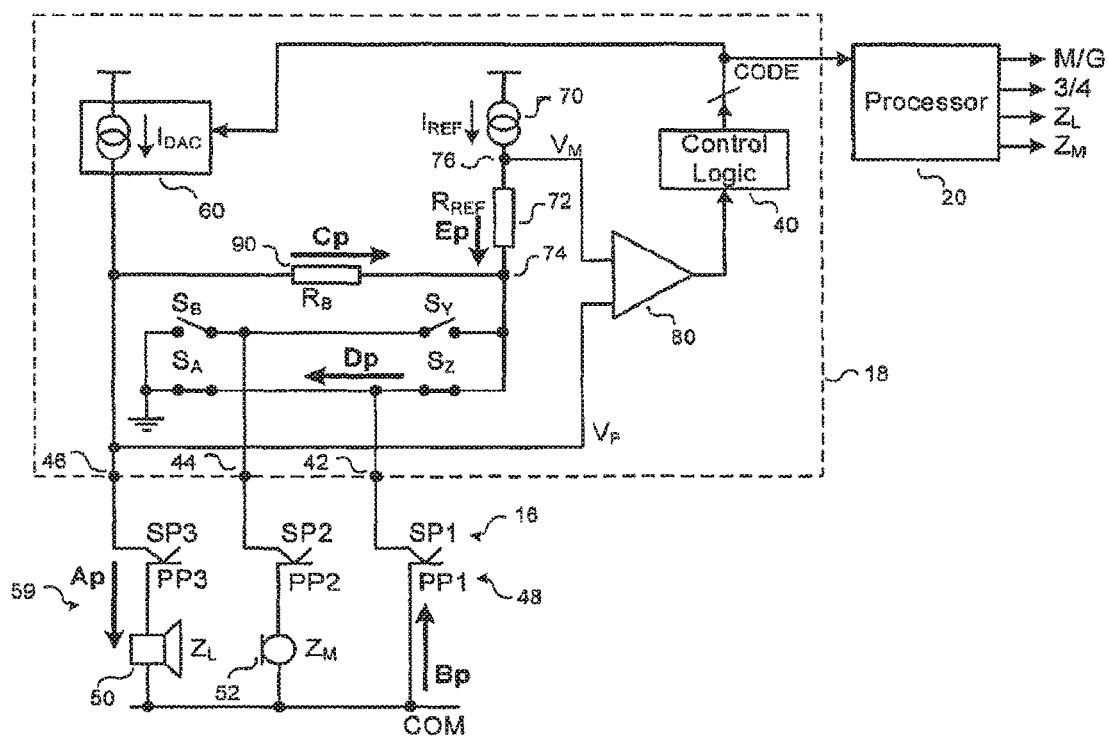
FIG. 13a illustrates a first use of the detection circuit of FIG. 6.

FIG. 13a shows the detection circuit of FIG. 6, in the first configuration, i.e. mode, with the switches $S_A$ and $S_Z$ closed and the switches $S_B$ and $S_Y$ open. FIG. 13a also shows jack plug 48 inserted into the jack socket 16, and the accessory 59 is wired such that a speaker 50 having an impedance $Z_L$ is connected to the jack plug pole PP3 and thence to the corresponding jack socket pole SP3 and a microphone 52 having an impedance $Z_M$ is connected to the jack plug pole PP2 and thence to the corresponding jack socket pole SP2, while the common connection COM is connected to the jack plug pole PP1 and thence to the corresponding jack socket pole SP1.

Thus, FIG. 13a shows the variable current $I_{DAC}$ being divided between a first path passing through the load $Z_L$ (arrow Ap) and returning to ground through the pole SP1 (arrow Bp) and a second path passing through the resistor $R_B$(arrow Cp) to ground (arrow Dp). FIG. 13a also shows the reference current $I_{REF}$ passing through the resistor 72 (arrow Ep) and then passing directly to ground (arrow Dp).

Figure 13B:
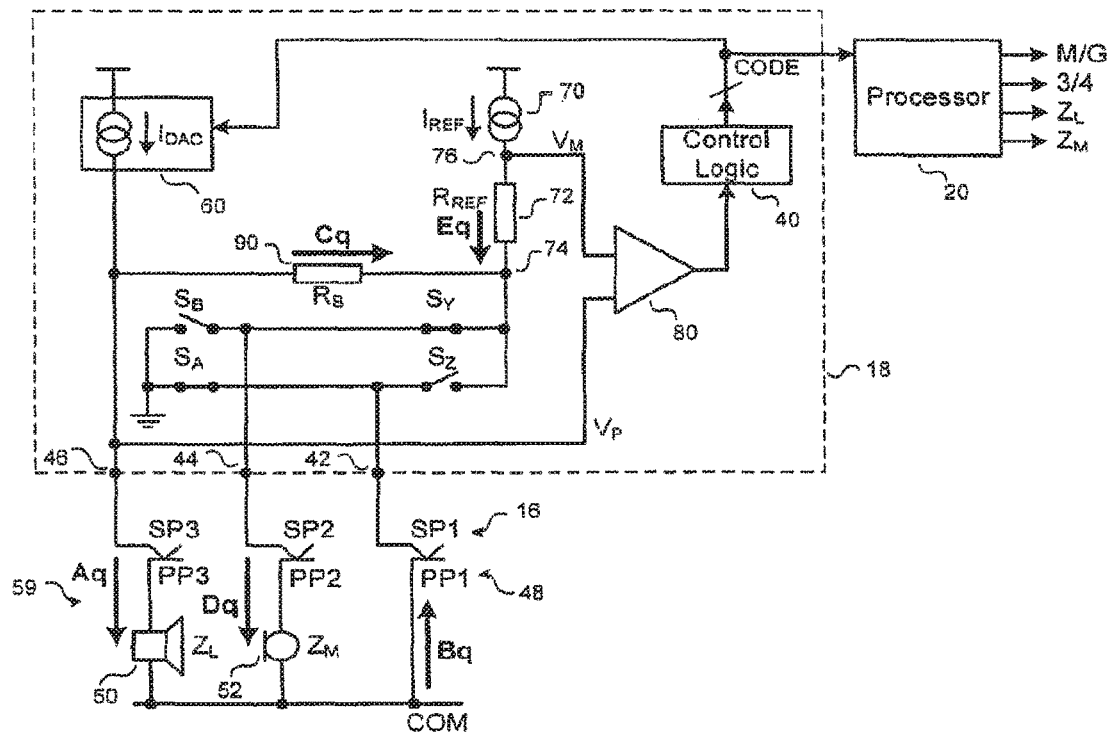
FIG. 13b illustrates a second use of the detection circuit of FIG. 6.

FIG. 13b shows the detection circuit of FIG. 6, in the second configuration, with the switches $S_A$ and $S_Y$ closed and the switches $S_B$ and $S_Z$ open. FIG. 13b shows the same jack plug as in FIG. 16 inserted into the jack socket 16.

Thus, FIG. 13b shows the variable current $I_{DAC}$ being divided between a first path passing through the load $Z_L$ (arrow Aq) and returning to ground through the pole SP1 (arrow Bq) and a second path passing through the resistor $R_B$(arrow Cq), pole SP2 and load $Z_M$ (arrow Dq) to ground (arrow Bq). FIG. 13b also shows the reference current $I_{REF}$ passing through the resistor 72 (arrow Eq) and then passing to ground through the load $Z_M$ (arrow Dq) and through the pole SP1 (arrow Bq).

Figure 13C:
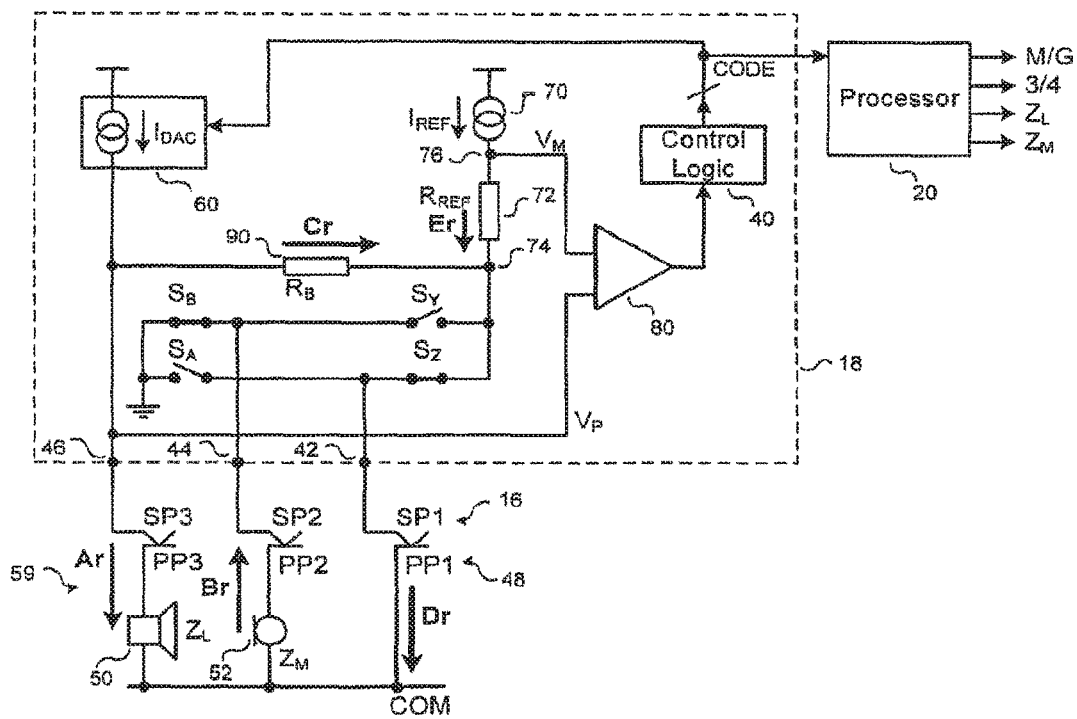
FIG. 13d illustrates a fourth use of the detection circuit of FIG. 6.

FIG. 13c shows the detection circuit of FIG. 6, in the third configuration, with the switches $S_B$ and $S_Z$ closed and the switches $S_A$ and $S_Y$ open. FIG. 13c shows the same jack plug as in FIG. 13a inserted into the jack socket 16.

Thus, FIG. 13c shows the variable current $I_{DAC}$ being divided between a first path passing through the load $Z_L$ (arrow Ar) and returning to ground through the load $Z_M$ and pole SP2 (arrow Br) and a second path passing through the resistor $R_B$ (arrow Cr), pole SP1 (arrow Dr), and load $Z_M$ (arrow Br) to ground. FIG. 13c also shows the reference current $I_{REF}$ passing through the resistor 72 (arrow Er) and then passing to ground through the pole SP1 (arrow Dr) and through the load $Z_M$ (arrow Br) and the pole SP2.

Figure 13D:
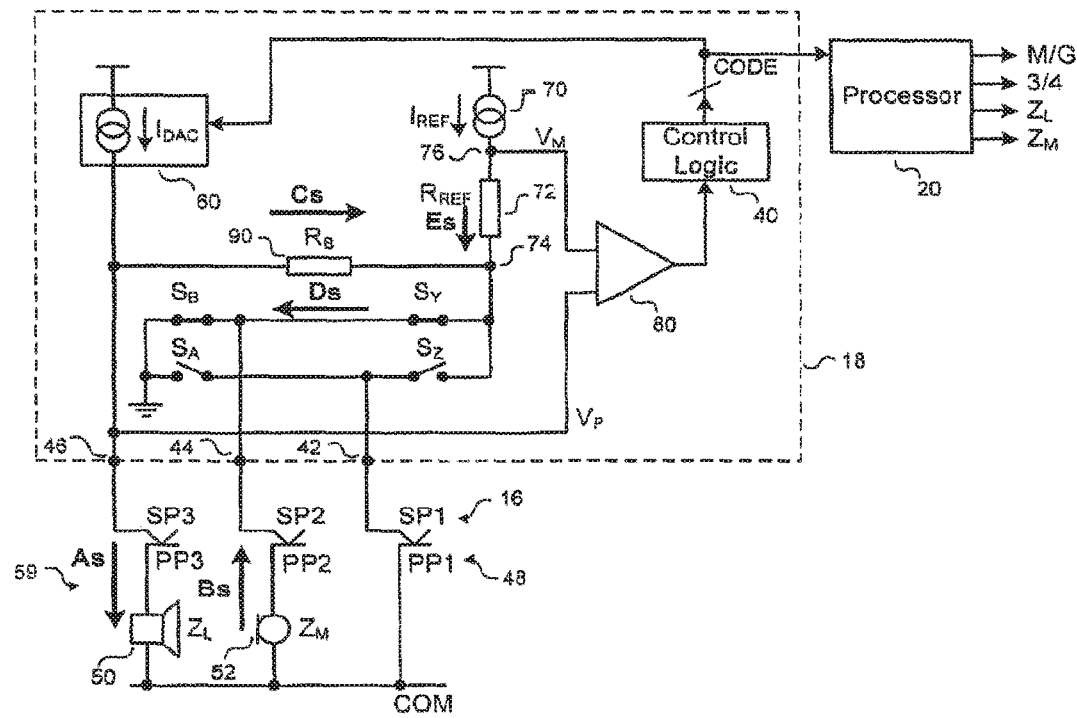

FIG. 13d shows the detection circuit of FIG. 6, in the fourth configuration, with the switches $S_B$ and $S_Y$ closed and the switches $S_A$ and $S_Z$ open. FIG. 13d shows the same jack plug as in FIG. 13a inserted into the jack socket 16.

Thus, FIG. 13d shows the variable current $I_{DAC}$ being divided between a first path passing through the load $Z_L$ (arrow As) and returning to ground through the load $Z_M$ and pole SP2 (arrow Bs) and a second path passing through the resistor $R_B$ (arrow Cs) to ground (arrow Ds). FIG. 13d also shows the reference current $I_{REF}$ passing through the resistor 72 (arrow Es) and then passing directly to ground (arrow Ds).

The following table shows the voltage $V_P$ on the terminal 46, and the voltage $V_M$ on the node 76, and the resulting output code for equality of $V_M$ and $V_P$ for three of the four configurations described above in respect of FIGS. 13a-13d, with the results obtained in the second configuration being too complicated to be useful in most cases. (As is conventional, the notation $(Z_L//R_B)$, or similar, indicates the impedance of the parallel combination of $Z_L$ and $R_B$.) Thus, based on knowledge of $R_{REF}$, $R_B$, and $N_{REF}$, the unknown load impedances $Z_L$ and $Z_M$ can be calculated from one or more of these measurements.

| $S_A$ | $S_B$ | $S_Z$ | $S_Y$ | $V_P$ | $V_M$ | CODE |
|---|---|---|---|---|---|---|
| ✓ |  | ✓ |  | $I_{DAC} \cdot (Z_L//R_B)$ | $I_{REF} \cdot R_{REF}$ | $N_{REF} \cdot R_{REF}/(Z_L//R_B)$ |
| ✓ |  |  | ✓ |  |  |  |
|  | ✓ | ✓ |  | $I_{DAC} \cdot (Z_L//R_B) + (I_{DAC} + I_{REF}) \cdot Z_M$ | $I_{REF} \cdot R_{REF} + (I_{DAC} + I_{REF}) \cdot Z_M$ | $N_{REF} \cdot R_{REF}/(Z_L//R_B)$ |
|  | ✓ |  | ✓ | $I_{DAC} \cdot \{(Z_L + Z_M)//R_B\}$ | $I_{REF} \cdot R_{REF}$ | $N_{REF} \cdot R_{REF}/\{(Z_L + Z_M)//R_B\}$ |

Figure 14A:
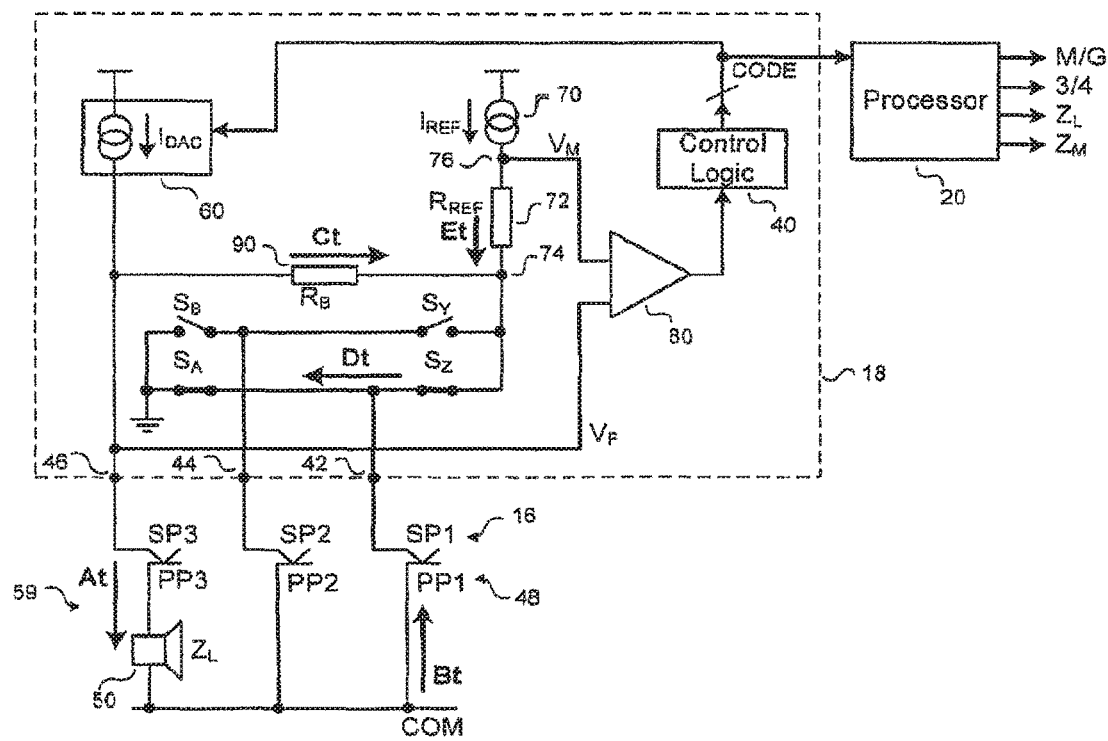
FIG. 14a illustrates a fifth use of the detection circuit of FIG. 6.

FIG. 14a shows the detection circuit of FIG. 6, in the first configuration, with the switches $S_A$ and $S_Z$ closed and the switches $S_B$ and $S_Y$ open. FIG. 14a also shows jack plug 48 inserted into the jack socket 16, and the accessory 59 is wired such that a speaker 50 having an impedance $Z_L$ is connected to the jack plug pole PP3 and thence to the corresponding jack socket pole SP3, while the jack plug poles PP1 and PP2 are both connected to a common connection (which typically arises when the jack plug 48 is a three-pole plug) and thence to the corresponding jack socket poles SP1 and SP2.

Thus, FIG. 14a shows the variable current $I_{DAC}$ being divided between a first path passing through the load $Z_L$ (arrow At) and returning to ground through the pole SP1 (arrow Bt) and a second path passing through the resistor $R_B$ (arrow Ct) to ground (arrow Dt). FIG. 14a also shows the reference current $I_{REF}$ passing through the resistor 72 (arrow Et) and then passing directly to ground (arrow Et).

Figure 14B:
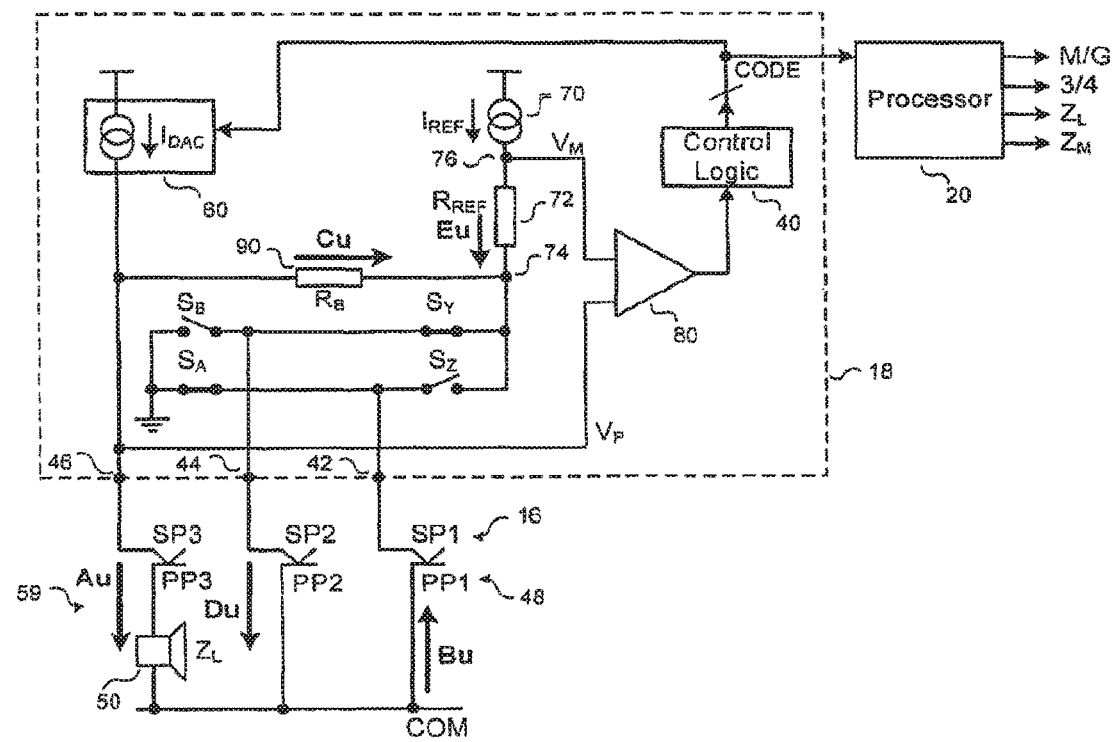
FIG. 14b illustrates a sixth use of the detection circuit of FIG. 6.

FIG. 14b shows the detection circuit of FIG. 6, in the second configuration, with the switches $S_A$ and $S_Y$ closed and the switches $S_B$ and $S_Z$ open. FIG. 14b shows the same jack plug as in FIG. 14a inserted into the jack socket 16.

Thus, FIG. 14b shows the variable current $I_{DAC}$ being divided between a first path passing through the load $Z_L$ (arrow Au) and returning to ground through the pole SP1 (arrow Bu) and a second path passing through the resistor $R_B$ (arrow Cu), pole SP2 (arrow Du) to ground (arrow Bu). FIG. 14b also shows the reference current $I_{REF}$ passing through the resistor 72 (arrow Eu) and then passing to ground through the pole SP2 (arrow Du) and through the pole SP1 (arrow Bu).

Figure 14C:
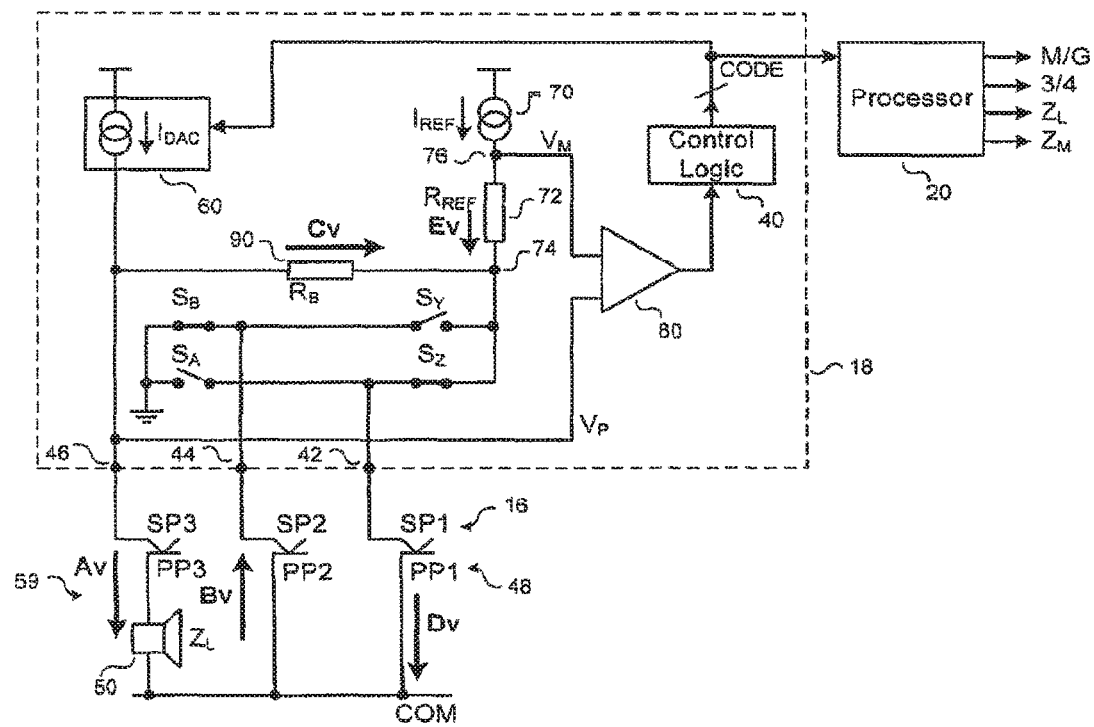
FIG. 14c illustrates a seventh use of the detection circuit of FIG. 6.

FIG. 14c shows the detection circuit of FIG. 6, in the third configuration, with the switches $S_B$ and $S_Z$ closed and the switches $S_A$ and $S_Y$ open. FIG. 14c shows the same jack plug as in FIG. 20 inserted into the jack socket 16.

Thus, FIG. 14c shows the variable current $I_{DAC}$ being divided between a first path passing through the load $Z_L$ (arrow Av) and returning to ground through the pole SP2 (arrow Bv) and a second path passing through the resistor $R_B$ (arrow Cv), pole SP1 (arrow Dv), and pole SP2 (arrow Bv) to ground. FIG. 14c also shows the reference current $I_{REF}$ passing through the resistor 72 (arrow Ev) and then passing to ground through the pole SP1 (arrow Dv) and through the pole SP2 (arrow Bv).

Figure 14D:
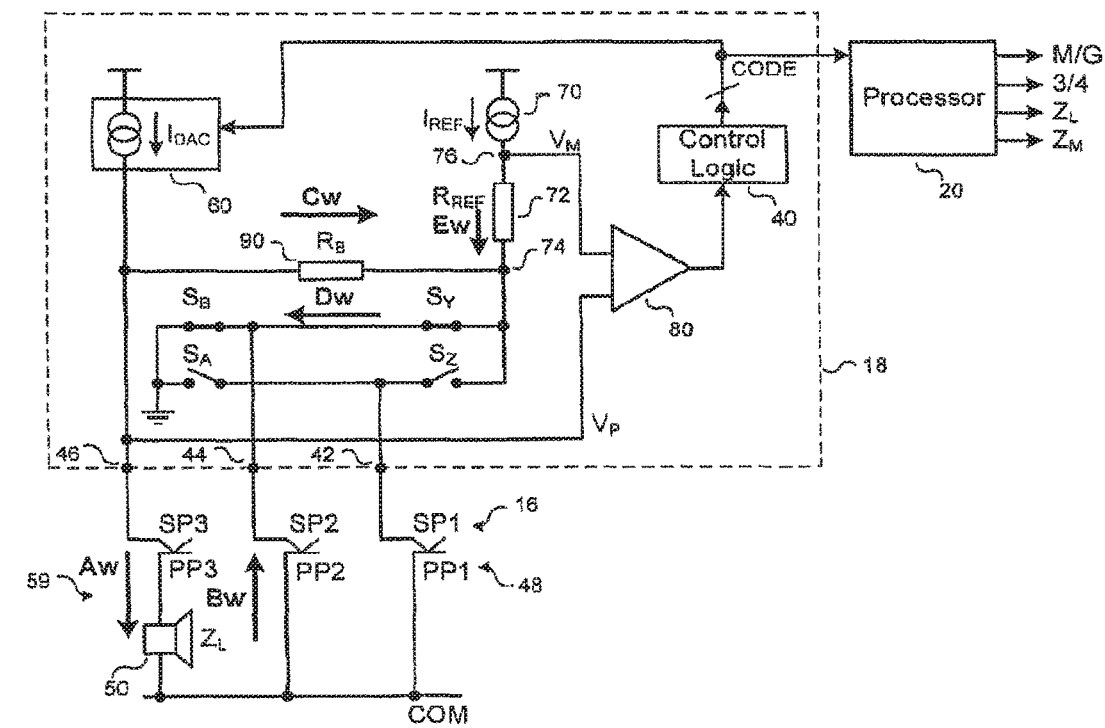
FIG. 14d illustrates an eighth use of the detection circuit of FIG. 6.

FIG. 14d shows the detection circuit of FIG. 6, in the fourth configuration, with the switches $S_B$ and $S_Y$ closed and the switches $S_A$ and $S_Z$ open. FIG. 14d shows the same jack plug as in FIG. 14a inserted into the jack socket 16.

Thus, FIG. 14d shows the variable current $I_{DAC}$ being divided between a first path passing through the load $Z_L$ (arrow Aw) and returning to ground through pole SP2 (arrow Bw) and a second path passing through the resistor $R_B$ (arrow Cw) to ground (arrow Dw). FIG. 14d also shows the reference current $I_{REF}$ passing through the resistor 72 (arrow Ew) and then passing directly to ground (arrow Dw).

The following table shows the voltage $V_P$ on the terminal 46, and the voltage $V_M$ on the node 76, in each of the four configurations described above in respect of FIGS. 14a-14d. As described previously, the variable current $I_{DAC}$ is controlled such that the voltages $V_P$ and $V_M$ are substantially equal. The final column in the table, headed CODE, is the code required to control the DAC to provide this equality. It will be noted that all four switch configurations give the same voltages and output CODE. From this code, and knowledge of $R_{REF}$, $R_B$ and $N_{REF}$, ZL may be determined, i.e. calculated.

| $S_A$ | $S_B$ | $S_Z$ | $S_Y$ | $V_P$ | $V_M$ | CODE |
|---|---|---|---|---|---|---|
| ✓ |   | ✓ |   | $I_{DAC} \cdot (Z_L//R_B)$ | $I_{REF} \cdot R_{REF}$ | $N_{REF} \cdot R_{REF}/(Z_L//R_B)$ |
| ✓ |   |   | ✓ | $I_{DAC} \cdot (Z_L//R_B)$ | $I_{REF} \cdot R_{REF}$ | $N_{REF} \cdot R_{REF}/(Z_L//R_B)$ |
|   | ✓ | ✓ |   | $I_{DAC} \cdot (Z_L//R_B)$ | $I_{REF} \cdot R_{REF}$ | $N_{REF} \cdot R_{REF}/(Z_L//R_B)$ |
|   | ✓ |   | ✓ | $I_{DAC} \cdot (Z_L//R_B)$ | $I_{REF} \cdot R_{REF}$ | $N_{REF} \cdot R_{REF}/(Z_L//R_B)$ |

Figure 15A:
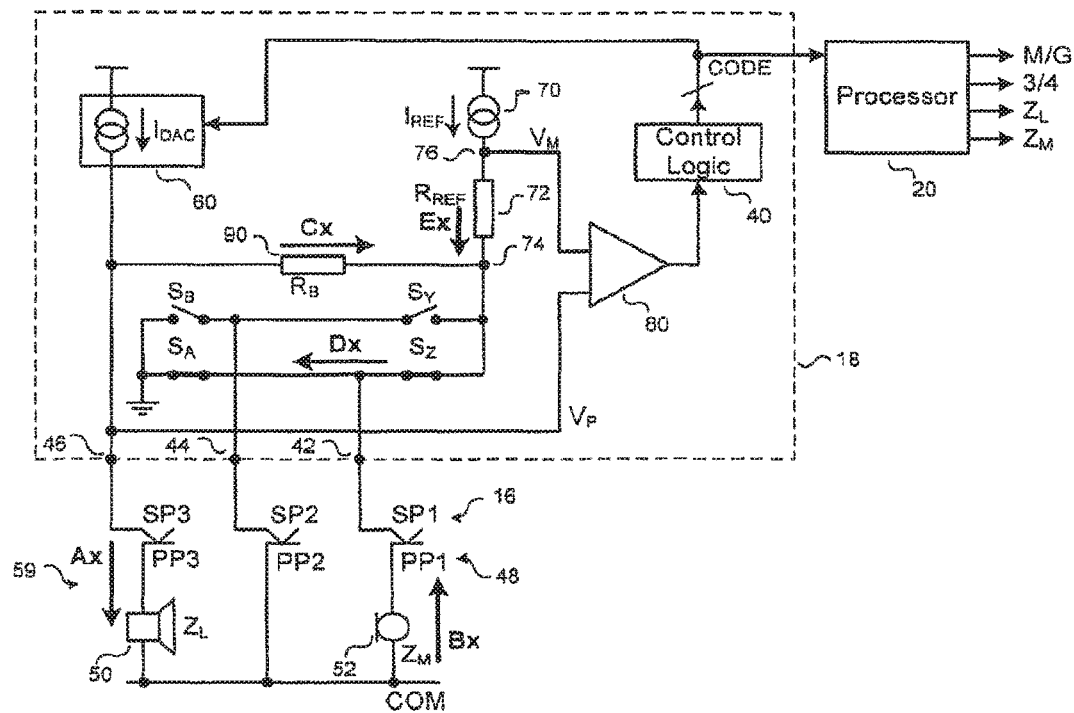
FIG. 15a illustrates a ninth use of the detection circuit of FIG. 6.

FIG. 15a shows the detection circuit of FIG. 6, in the first configuration, with the switches $S_A$ and $S_Z$ closed and the switches $S_B$ and $S_Y$ open. FIG. 15a also shows jack plug 48 inserted into the jack socket 16, and the accessory 59 is wired such that a speaker 50 having an impedance $Z_L$ is connected to the jack plug pole PP3 and thence to the corresponding jack socket pole SP3. In this case, the jack plug 48 is wired such that a microphone 52 having an impedance $Z_M$ is connected to the jack plug pole PP1 and thence to the corresponding jack socket pole SP1, while the common connection COM is connected to the jack plug pole PP2 and thence to the corresponding jack socket pole SP2.

Thus, FIG. 15a shows the variable current $I_{DAC}$ being divided between a first path passing through the load $Z_L$ (arrow Ax) and returning to ground through the load $Z_M$ and the pole SP1 (arrow Bx) and a second path passing through the resistor $R_B$ (arrow Cx) to ground (arrow Dx). FIG. 15a also shows the reference current $I_{REF}$ passing through the resistor 72 (arrow Ex) and then passing directly to ground (arrow Dx).

Figure 15B:
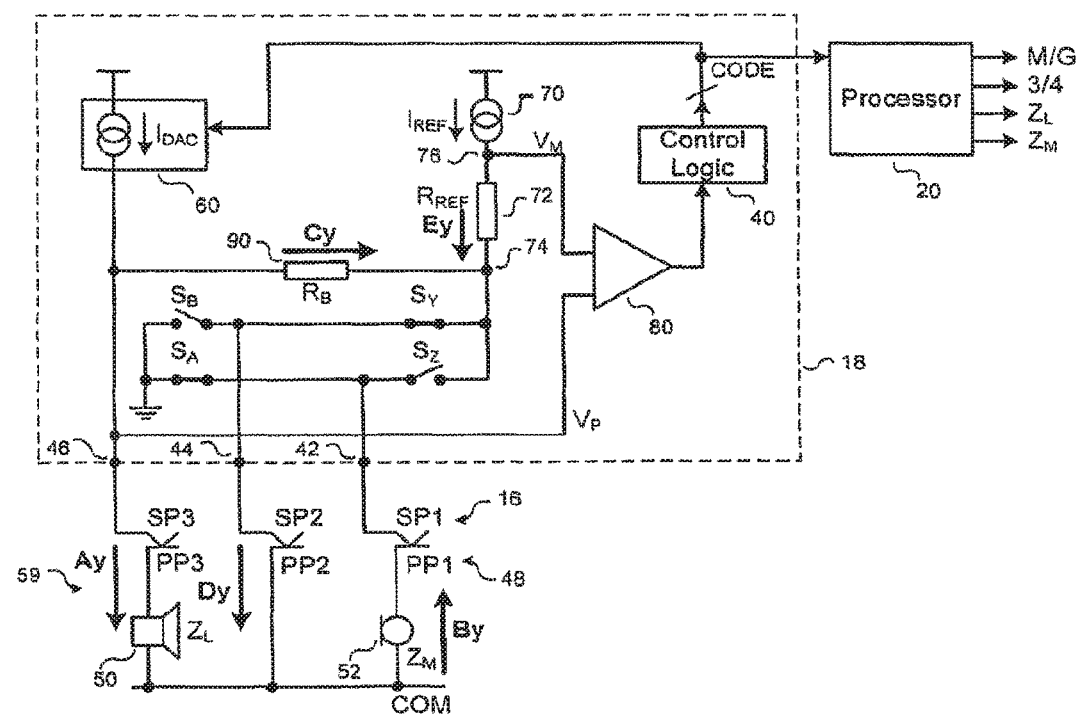
FIG. 15b illustrates a tenth use of the detection circuit of FIG. 6.

FIG. 15b shows the detection circuit of FIG. 6, in the second configuration, with the switches $S_A$ and $S_Y$ closed and the switches $S_B$ and $S_Z$ open. FIG. 15b shows the same jack plug as in FIG. 15a inserted into the jack socket 16.

Thus, FIG. 15b shows the variable current $I_{DAC}$ being divided between a first path passing through the load $Z_L$ (arrow Ay) and returning to ground through the load $Z_M$ and pole SP1 (arrow By) and a second path passing through the resistor $R_B$ (arrow Cy), pole SP2 (arrow Dy) and load $Z_M$ (arrow By) to ground. FIG. 15b also shows the reference current $I_{REF}$ passing through the resistor 72 (arrow Ey) and then passing to ground through the pole SP2 (arrow Dy) and through the load $Z_M$ and pole SP1 (arrow By).

Figure 15C:
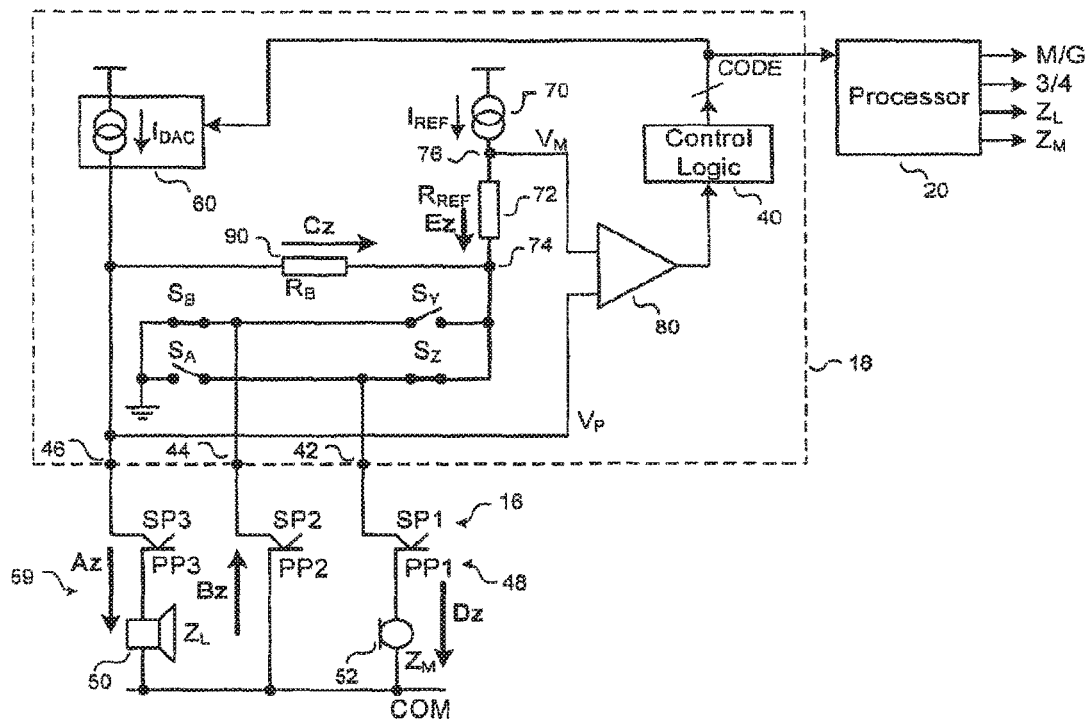
FIG. 15c illustrates an eleventh use of the detection circuit of FIG. 6.

FIG. 15c shows the detection circuit of FIG. 6, in the third configuration, with the switches $S_B$ and $S_Z$ closed and the switches $S_A$ and $S_Y$ open. FIG. 15c shows the same jack plug as in FIG. 15a inserted into the jack socket 16.

Thus, FIG. 15c shows the variable current $I_{DAC}$ being divided between a first path passing through the load $Z_L$ (arrow Az) and returning to ground through the pole SP2 (arrow Bz) and a second path passing through the resistor $R_B$ (arrow Cz), pole SP1 and load $Z_M$ (arrow Dz), and pole SP2 (arrow Bz) to ground. FIG. 15c also shows the reference current $I_{REF}$ passing through the resistor 72 (arrow Ez) and then passing to ground through the pole SP1 and load $Z_M$ (arrow Dz) and through the pole SP2 (arrow Bz).

Figure 15D:
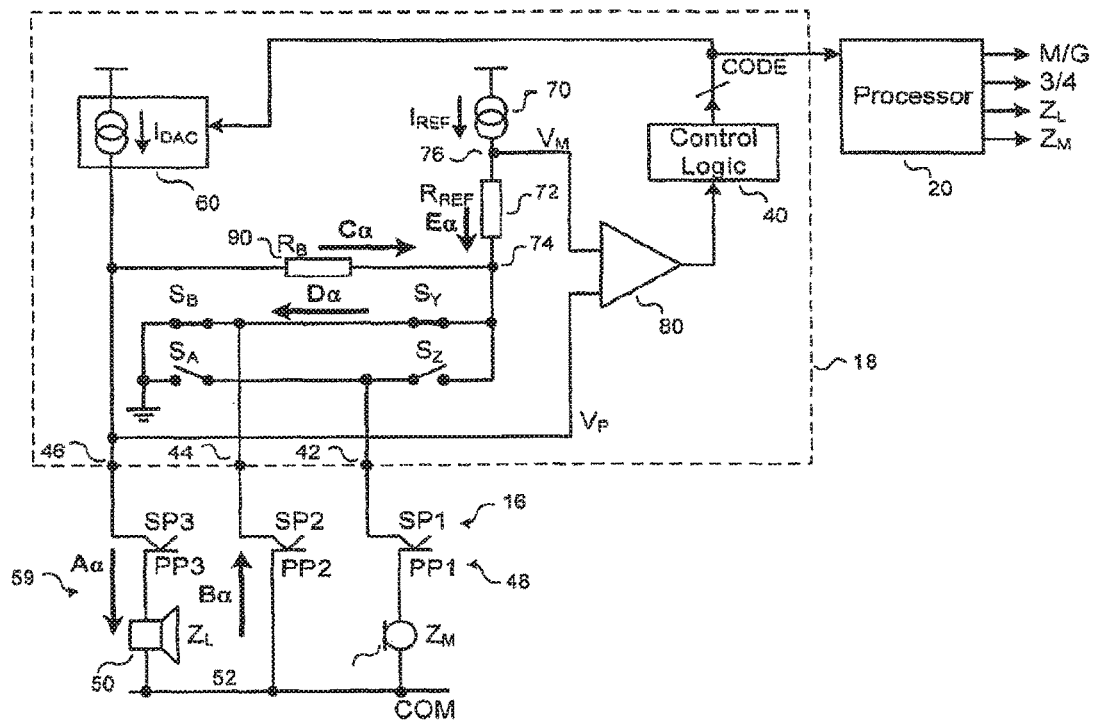
FIG. 15d illustrates a twelfth use of the detection circuit of FIG. 6.

FIG. 15d shows the detection circuit of FIG. 6, in the fourth configuration, with the switches $S_B$ and $S_Y$ closed and the switches $S_A$ and $S_Z$ open. FIG. 15d shows the same jack plug as in FIG. 15a inserted into the jack socket 16.

Thus, FIG. 15d shows the variable current $I_{DAC}$ being divided between a first path passing through the load $Z_L$ (arrow Aα) and returning to ground through pole SP2 (arrow Bα) and a second path passing through the resistor $R_B$ (arrow Cα7) to ground (arrow Dα). FIG. 15d also shows the reference current $I_{REF}$ passing through the resistor 72 (arrow Eα) and then passing directly to ground (arrow Dα).

The following table shows the voltage $V_P$ on the terminal 46, the voltage $V_M$ on the node 76, and the resulting output code for equality of $V_M$ and $V_P$, for three of the four configurations described above in respect of FIGS. 15a-15d, with the results obtained in the third configuration being too complicated to be useful in most cases. From one or more of these codes, based on knowledge of $R_{REF}$, $R_B$, and $N_{REF}$, the unknown load impedances $Z_L$ and $Z_M$ can be calculated.

| $S_A$ | $S_B$ | $S_Z$ | $S_Y$ | $V_P$ | $V_M$ | CODE |
|---|---|---|---|---|---|---|
| ✓ | | | ✓ | $I_{DAC} \cdot \{(Z_L + Z_M)//R_B\}$ | $I_{REF} \cdot R_{REF}$ | $N_{REF} \cdot R_{REF}/\{(Z_L + Z_M)//R_B\}$ |
| ✓ | | ✓ | ✓ | $I_{DAC} \cdot (Z_L//R_B) + (I_{DAC} + I_{REF}) \cdot Z_M$ | $I_{REF} \cdot R_{REF} + (I_{DAC} + I_{REF}) \cdot Z_M$ | $N_{REF} \cdot R_{REF}/(Z_L//R_B)$ |
| | ✓ | ✓ | | — | — | — |
| | ✓ | | ✓ | $I_{DAC} \cdot (Z_L//R_B)$ | $I_{REF} \cdot R_{REF}$ | $N_{REF} \cdot R_{REF}/(Z_L//R_B)$ |

Thus, it is possible to summarising the above results in respect of FIGS. 13-15 in a table as shown below, from which it can be seen that each combination may provide one of three results for the code. So, by performing at least two measurements of the possible four, the speaker and microphone impedances and the common-connection pole may be identified, for example, by simple calculations in the processor.

| $S_A$ | $S_B$ | $S_Z$ | $S_Y$ | Jack Plug of Figure 13 | Jack Plug of Figure 14 | Jack Plug of Figure 15 |
|---|---|---|---|---|---|---|
| | | | | SP1 = COM<br>SP2 = $Z_M$ | SP1 = COM<br>SP2 = COM | SP1 = $Z_M$<br>SP2 = COM |
| ✓ | | | ✓ | $N_{REF} \cdot R_{REF}/(Z_L//R_B)$ | $N_{REF} \cdot R_{REF}/(Z_L//R_B)$ | $N_{REF} \cdot R_{REF}/\{(Z_L + Z_M)//R_B\}$ |
| ✓ | | ✓ | | | $N_{REF} \cdot R_{REF}/(Z_L//R_B)$ | $N_{REF} \cdot R_{REF}/(Z_L//R_B)$ |
| | ✓ | ✓ | | $N_{REF} \cdot R_{REF}/(Z_L//R_B)$ | $N_{REF} \cdot R_{REF}/(Z_L//R_B)$ | |
| | ✓ | | ✓ | $N_{REF} \cdot R_{REF}/\{(Z_L + Z_M)//R_B\}$ | $N_{REF} \cdot R_{REF}/(Z_L//R_B)$ | $N_{REF} \cdot R_{REF}/(Z_L//R_B)$ |

Figure 16:
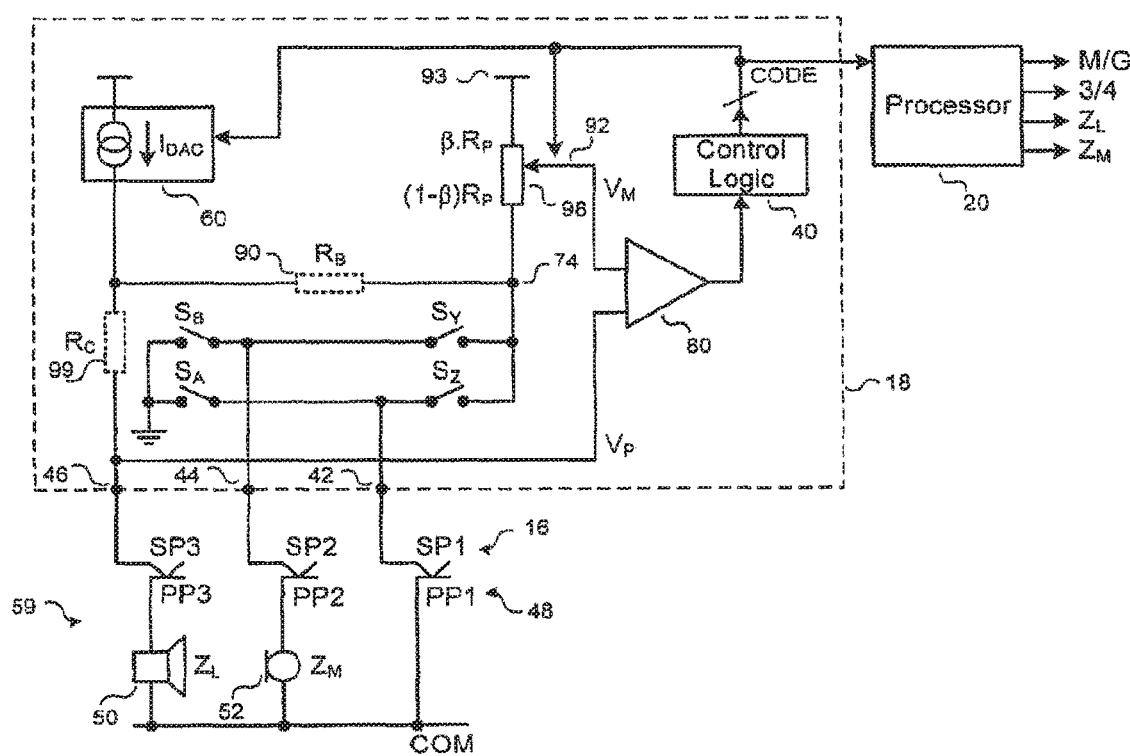
FIG. 16 illustrates a fourth detection circuit in accordance with the invention.

FIG. 16 illustrates an alternative form of the detection circuit 18. The detection circuit of FIG. 16 is generally similar to the detection circuit of FIG. 5, and similar components are indicated by the same reference numerals, except as described in more detail below.

Specifically, the operation of the detection circuit 18 is controlled by a control logic block 40, which in this illustrated embodiment passes output data to an external processor 20.

The detection circuit 18 has three input/output terminals 42, 44, 46, which are shown connected to three poles SP1, SP2 and SP3 respectively of the jack socket 16.

FIG. 16 also shows the situation where a jack plug 48 is inserted into the jack socket 16.

The detection circuit 18 includes a controllable current source 60, which includes a digital-analogue-converter (DAC) that receives a control word from the control logic block 40, and generates a current $I_{DAC}$ in response thereto. The variable current source 60 is connected to the terminal 46 of the detection circuit 18.

The detection circuit 18 also includes a resistor 98, having a resistance value $R_P$ connected between a voltage source 93 and a node 74. The control logic block 40 controls the position of a wiper, which divides the resistor 98 into a first part having a resistance $\beta \cdot R_P$ and a second part having a resistance $(1-\beta) \cdot R_P$.

The voltage at the terminal 46 is passed to a first input of a comparator 80, while the voltage $V_M$ at the wiper 92 is passed to a second input of the comparator 80. The output of the comparator 80 is passed to the control logic block 40.

The terminal 42 is connected to ground through a first switch $S_A$, and is connected to the node 74 through a second switch $S_Z$. The terminal 42 is connected to ground through a third switch $S_B$, and is connected to the node 74 through a fourth switch $S_Y$.

Opening and closing the switches $S_A$ and $S_B$ determines whether the variable current $I_{DAC}$, after passing through any load that is connected to the jack socket pole SP3, returns to ground through any load that is connected to the jack socket pole SP1 or through any load that is connected to the jack socket pole SP3.

Similarly, opening and closing the switches $S_A$, $S_Z$, $S_B$, and $S_Y$ determines whether the node 74 is connected directly to ground, or whether the current $I_{REF}$ flows to ground through any load that is connected to one of the jack socket poles SP1 or SP3.

More specifically, four switch configurations are possible, namely when one of the switches $S_A$ and $S_B$ is closed (that is, passing current) and the other is open, and when one of the switches $S_Y$ and $S_Z$ is closed (that is, passing current) and the other is open.

In each of the four possible combinations, the operation of the detection circuit is that the position of the wiper 92 is altered until the comparator 80 indicates that the voltage at the terminal 46 (on the first input of the comparator 80), is as nearly as possible equal to the voltage at the wiper 92 (on the second input of the comparator 80). The voltage at the terminal 46 is equal to the product of the variable current $I_{DAC}$ at that time and the resistance between the terminal 46 and ground. The voltage at the wiper 92 is a share of the voltage generated by the voltage source 93, depending on the value of $\beta$ and on the resistance connected between the resistor 98 and ground.

By taking measurements with the switches in different configurations, it is possible to obtain a value for the impedance of the load $Z_L$ and to determine how the jack plug 48 is wired to its associated transducers and ground potential.

Figure 17:
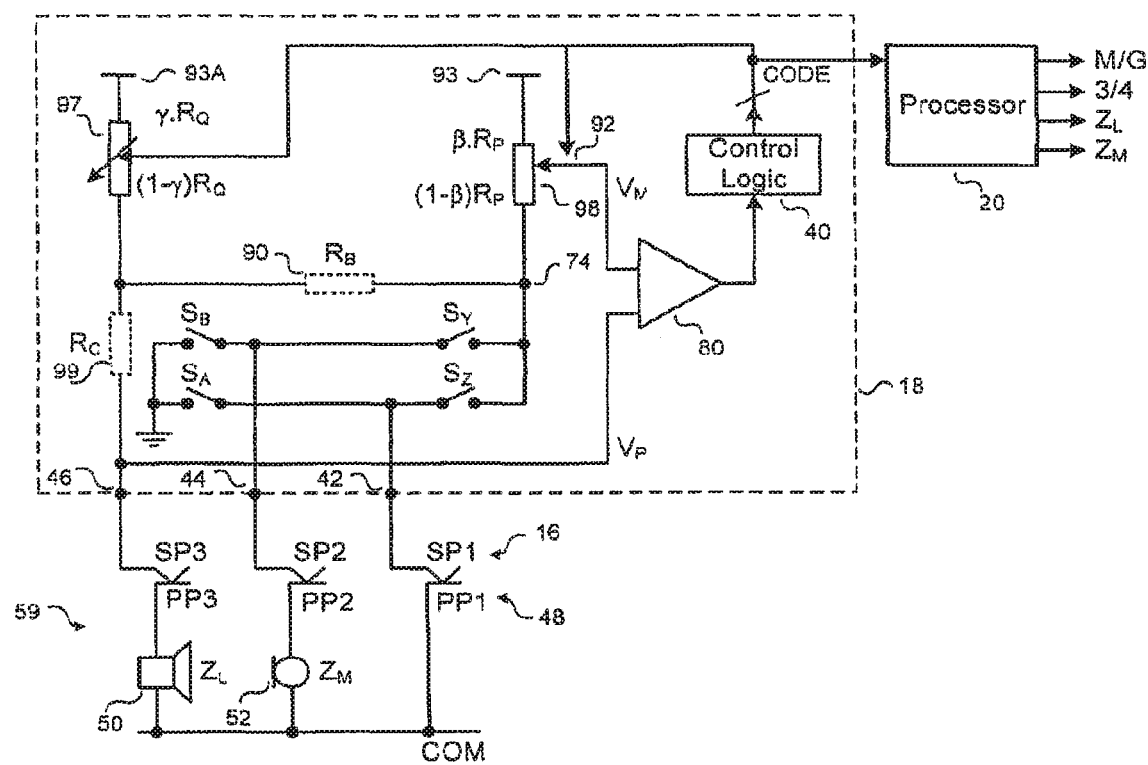
FIG. 17 illustrates a fifth detection circuit in accordance with the invention.

Similarly, as illustrated in FIG. 17, the current source DAC 60 may be replaced by current sourcing circuitry using a variable resistor 97 connected to a known reference voltage to source a variable current controlled by a digital code, in conjunction with either using a resistor $R_P$ as a potential divider as illustrated, or a fixed resistor $R_P$ or current source $I_{REF}$, as described above, as current sourcing circuitry in the other leg of the circuitry.

In the embodiments above, first current sourcing circuitry 160 sources current via terminal 46 to a socket pole SP3. In further embodiments, further switching circuitry may be inserted to convey this current to other terminals wired to other poles of the socket, particularly for embodiments with more than three poles.

Figure 18:
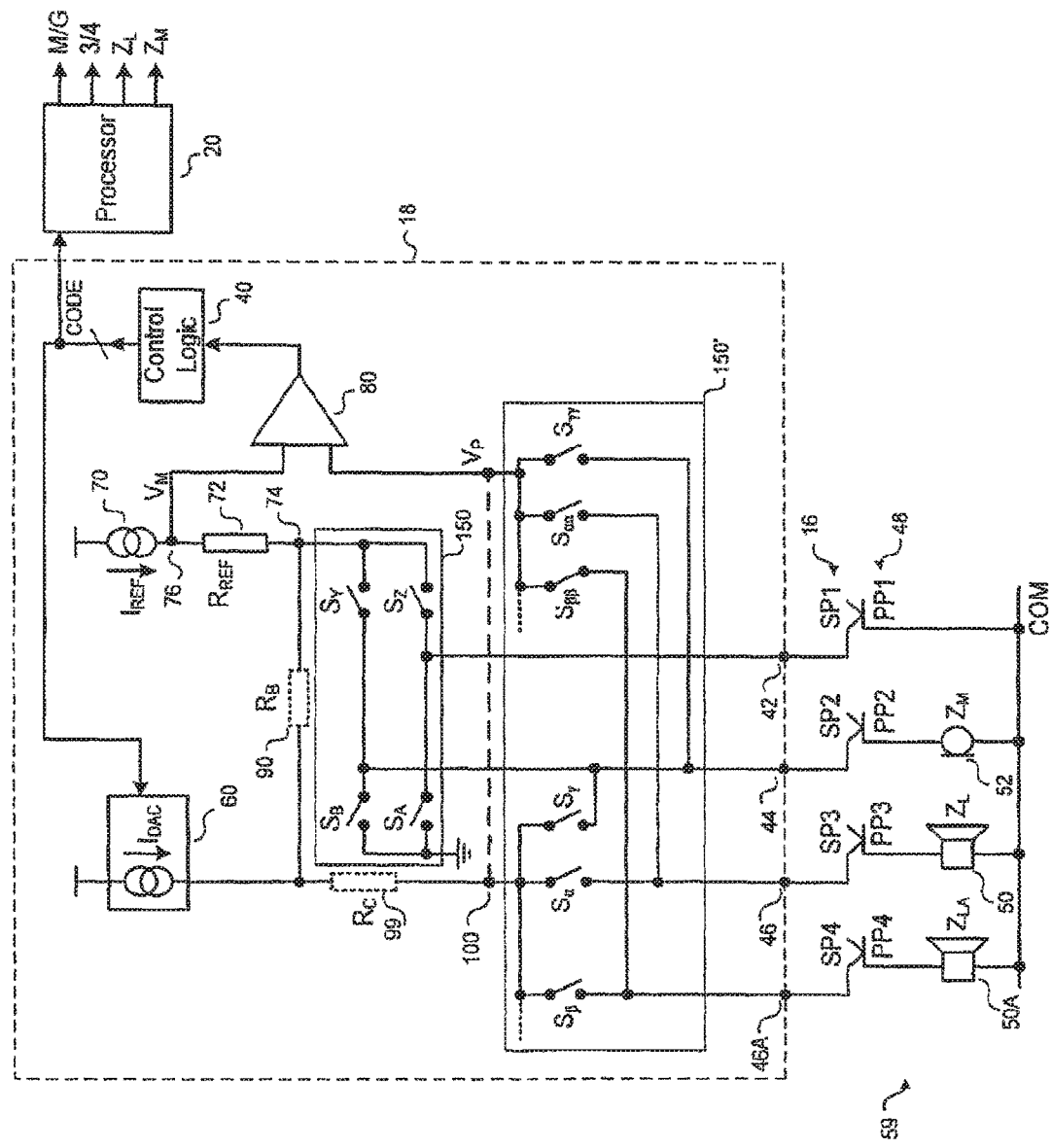
FIG. 18 illustrates a sixth detection circuit in accordance with the invention.

FIG. 18 illustrates a variant of detector circuitry 18 in which a fourth terminal 46A is present and wired to the fourth pole of a jack socket 16 and hence to a fourth accessory impedance 50A. Detector circuitry 18 includes an additional network of switches 150' comprising switches $S_\alpha$, $S_\beta$, and $S_\gamma$ that are connected to terminals 46, 46A, and 44 respectively. The other poles of these switches are connected together at a node 100 and coupled to the first current source 60, possibly via limiting resistance $R_C$ discussed above.

The first comparator input, i.e. voltage $V_P$, may also be connected to node 100, as illustrated by the dashed line.

However, preferably the comparator input node is also connected to the terminals 46, 46A and 44 via the respective additional switches $S_{\alpha\alpha}$, $S_{\beta\beta}$, and $S_{\gamma\gamma}$, of the switch network 150' and these additional switches are switched, i.e. controlled, in the same way as the switches $S_\alpha$, $S_\beta$, and $S_\gamma$, respectively.

When switches $S_\alpha$ and $S_{\alpha\alpha}$ are closed, the circuit may be operated in the measurement modes described above.

By connecting $V_P$ to terminal 46 via switch path $S_{\alpha\alpha}$ rather than via node 100, the resistance of switch $S_\alpha$ no longer appears in series with $Z_L$ before being sensed by the comparator, increasing the measurement accuracy, especially with low values of $Z_L$ such as 4Ω, and allowing the switch $S_\alpha$ to be higher resistance, and thus occupy less silicon area.

When switches $S_\beta$ and $S_{\beta\beta}$ are closed, the circuit may be operated in very similar modes, but with poles SP4 and PP4 taking the place of SP3 and PP3.

It will be appreciated by those skilled in the art that the switch network 150' ($S_\alpha$, $S_\beta$, $S_\gamma$, $S_{\alpha\alpha}$, $S_{\beta\beta}$, $S_{\gamma\gamma}$) may, according to usage cases, be considered as part of the switch network 150 ($S_A$, $S_B$, $S_Y$, $S_Z$), i.e. switch network 150 may also comprise switch network 150'.

This may be useful to handle a wider range of accessory plug wiring configurations, or where PP3 is connected to a high impedance load or even is open circuit and where say a fourth pole PP4 is wired to a lower impedance, allowing more accurate measurements though this pole. In some cases, the fourth pole may be brought into play on the basis of prior measurements via the third pole.

In some cases this further switching circuitry may be configurable to convey first current sourcing circuitry current to poles SP1 or SP2. As an example, to handle some eventualities, and to allow identification of a wider range of impedances, it may also be advantageous to allow further measurement modes, in which the terminal 44 may also be coupled to current source 60, via a switch $S_\gamma$, with $V_P$ then being connected to terminal 44 via switch path $S_{\gamma\gamma}$.

The resulting circuit networks may be analysed by normal circuit analysis methods as above and the resulting CODE words appropriately interpreted.

Figure 19:
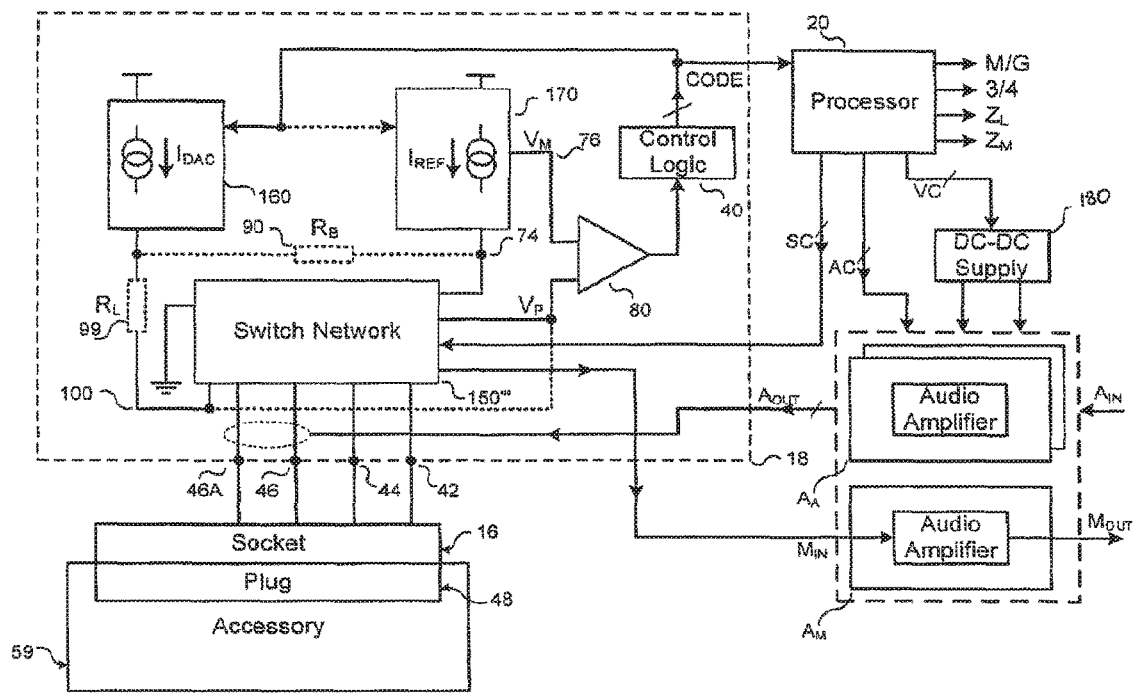
FIG. 19 illustrates the general form of a detection circuit in accordance with the invention, and its connection to other components of an electronic device.

FIG. 19 illustrates additional circuitry that is associated with FIG. 18, for example provided in the electronic device 10 separately from the detection circuit 18, or provided on the same integrated circuit as the detection circuitry.

FIG. 19 further shows audio amplifiers $A_A$ and $A_M$, a DC-DC supply 180 and a plurality of control signals output from the processing circuitry 20.

The audio amplifiers are illustrated as comprising two sets of amplifiers.

One set $A_M$ of the amplifiers receives an input signal $M_{IN}$, via the switch network 150''', from a microphone 52 that has been detected in the peripheral device 59, i.e. the accessory. The microphone amplifier $A_M$ outputs an amplified version $M_{OUT}$ of the input signal $M_{IN}$ which is may be applied to a baseband processor (not illustrated) for transmission over a wireless communications network.

The other set of amplifiers $A_A$ receive an input signal $A_{IN}$, which may be voice signals received over a wireless communications network or may be stereo music, which is amplified and applied to the speakers 50, 50A in the accessory 59. The respective outputs of the speaker amplifiers $A_A$ are typically hardwired to the terminals 46, 46A for connection to the left and right speakers in the accessory 59.

The audio speaker amplifiers illustrated in FIG. 19 may contain more than just one amplifier in their respective signal paths. For example, each of the two speaker amplifiers, assuming a stereo input signal $A_{IN}$ is being processed, may comprise clocked digital-to-analogue converters (DACs) to extract the left (L) and right (R) audio signals from the input audio signal $A_{IN}$ and apply the extracted L/R analogue audio signals to respective preamplifiers that then respectively drive power amplifiers. Similarly, the microphone amplifier may comprise an analogue-to-digital converter (ADC) to convert the microphone input signal $M_{IN}$ to an amplified digital microphone output signal $M_{OUT}$ for application to a preamplifier. Such arrangements and variations of audio amplifiers are well known in the art.

The processor 20 may output control signals AC that control the operation of the amplifiers in response to a received code CODE. For example, if no microphone is detected then the processor 20 may disable the microphone amplifier $A_M$ to save power and open the signal path in the switch matrix 150'''.

The processor 20 may also output control signals VC, in response to a received code CODE, that control the operation of the charge pump or inductor DC-DC supply that typically supplies one or more components in the amplifiers with supply voltages, unipolar and/or bipolar.

Thus, many different parameters of the operation of the amplifiers can be optimised based on the detected impedance value of the speaker 50, 50A, parameters comprising for example: bias current(s); supply voltage(s); DC-DC converter clock frequency or operational mode or maximum safe power level etc. Also, the appropriate ground and signal connections may be made in the portable device, based on the determination as to which pole of the jack plug is connected to the common connection COM and which other pole is connected to a non-zero impedance $Z_M$ of a microphone or other transducer.

Figure 20:
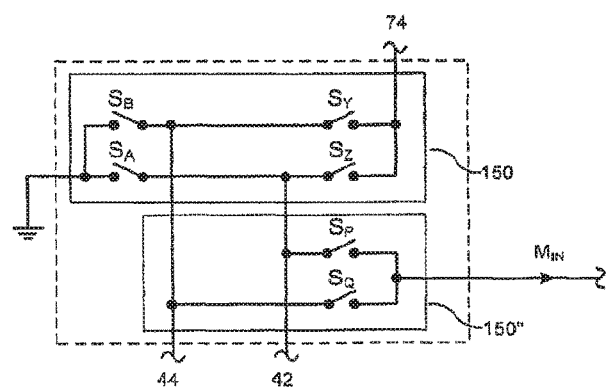
FIG. 20 illustrates one possible form of the switch network in the detection circuit of FIG. 19.

FIG. 20 illustrates an alternative embodiment of the switch matrix 150''' of FIG. 19.

FIG. 20 further comprises switches $S_P$ and $S_Q$. Switch $S_P$ is connected between the input terminal of the microphone amplifier $A_M$ and terminal 42 and switch $S_Q$ is connected between the input terminal of the microphone amplifier $A_M$ and terminal 44.

Switches $S_P$ and $S_Q$ are controlled by the processor in conjunction with switches $S_A$ and $S_B$ so as to effectively swap the order of the plug poles PP1 and PP2 as received from the switch network 150''' by the remainder of the determination circuitry 18 based on the determination as to which pole of the jack plug is connected to the common connection COM and which other pole is connected to a non-zero impedance $Z_M$ of a microphone or other transducer.

Again it will be appreciated by those skilled in the art that the switch network 150" ($S_P$, $S_Q$) may, according to usage cases, be considered as part of the switch network 150 ($S_A$, $S_B$, $S_Y$, $S_Z$), i.e. switch network 150" may also comprise switch network 150.

Figure 21:
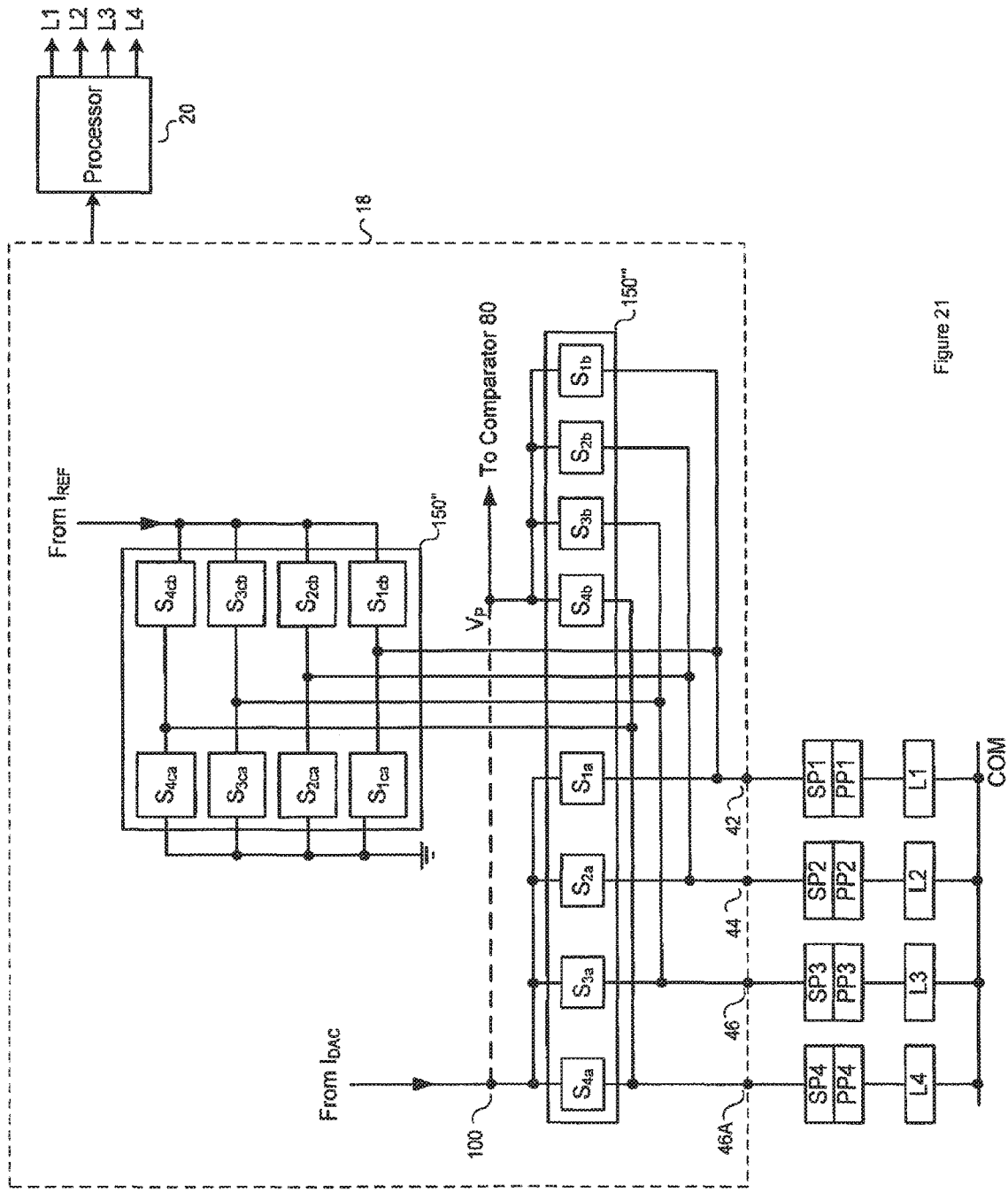
FIG. 21 is a general illustration of a detection circuit in accordance with the invention.

FIG. 21 is an alternative illustration of detector circuitry 18 similar to that shown in FIG. 18. As in FIG. 18, a fourth terminal 46A is present. In this case, the jack socket has four poles SP1, SP2, SP3 and SP4, for connection to corresponding poles PP1, PP2, PP3 and PP4 on a jack plug, the poles of the jack plug being connected to load impedances L1, L2, L3 and L4 respectively.

The detector circuitry 18 includes an additional network of switches 150''' comprising switches $S_{1a}$, $S_{2a}$, $S_{3a}$, and $S_{4a}$, that are connected to terminals 42, 44, 46, and 46A respectively. The other poles of these switches are connected together at a node 100 and coupled to the first current source 60, for example the $I_{DAC}$, possibly via a limiting resistance $R_C$, as described above.

The first comparator input, i.e. voltage $V_P$, may also be connected to node 100, as illustrated by the dashed line. The comparator input node is also connected to the terminals 42, 44, 46, and 46A via the respective additional switches $S_{1b}$, $S_{2b}$, $S_{3b}$, and $S_{4b}$ of the switch network 150''' and these additional switches are switched, i.e. controlled, in the same way as the switches $S_{1a}$, $S_{2a}$, $S_{3a}$, and $S_{4a}$ respectively.

The reference current $I_{REF}$ can be connected to ground through any of the pairs of switches $S_{1ca}$, $S_{1cb}$; $S_{2ca}$, $S_{2cb}$; $S_{3ca}$, $S_{3cb}$; and/or $S_{4ca}$, $S_{4cb}$ in the switching block 150''. The connection point of the switches $S_{1ca}$ and $S_{1cb}$ is connected to the terminal 42. The connection point of the switches $S_{2ca}$ and $S_{2cb}$ is connected to the terminal 44. The connection point of the switches $S_{3ca}$ and $S_{3cb}$ is connected to the terminal 46. The connection point of the switches $S_{4ca}$ and $S_{4cb}$ is connected to the terminal 46A.

By closing of the various switches in sequence, the circuit may be operated in the measurement modes described above.

The resulting circuit networks may be analysed by normal circuit analysis methods as above and the resulting CODE words appropriately interpreted, so that the processor 20 generates output signals indicating the values of the loads L1, L2, L3, and L4.

Figure 22:
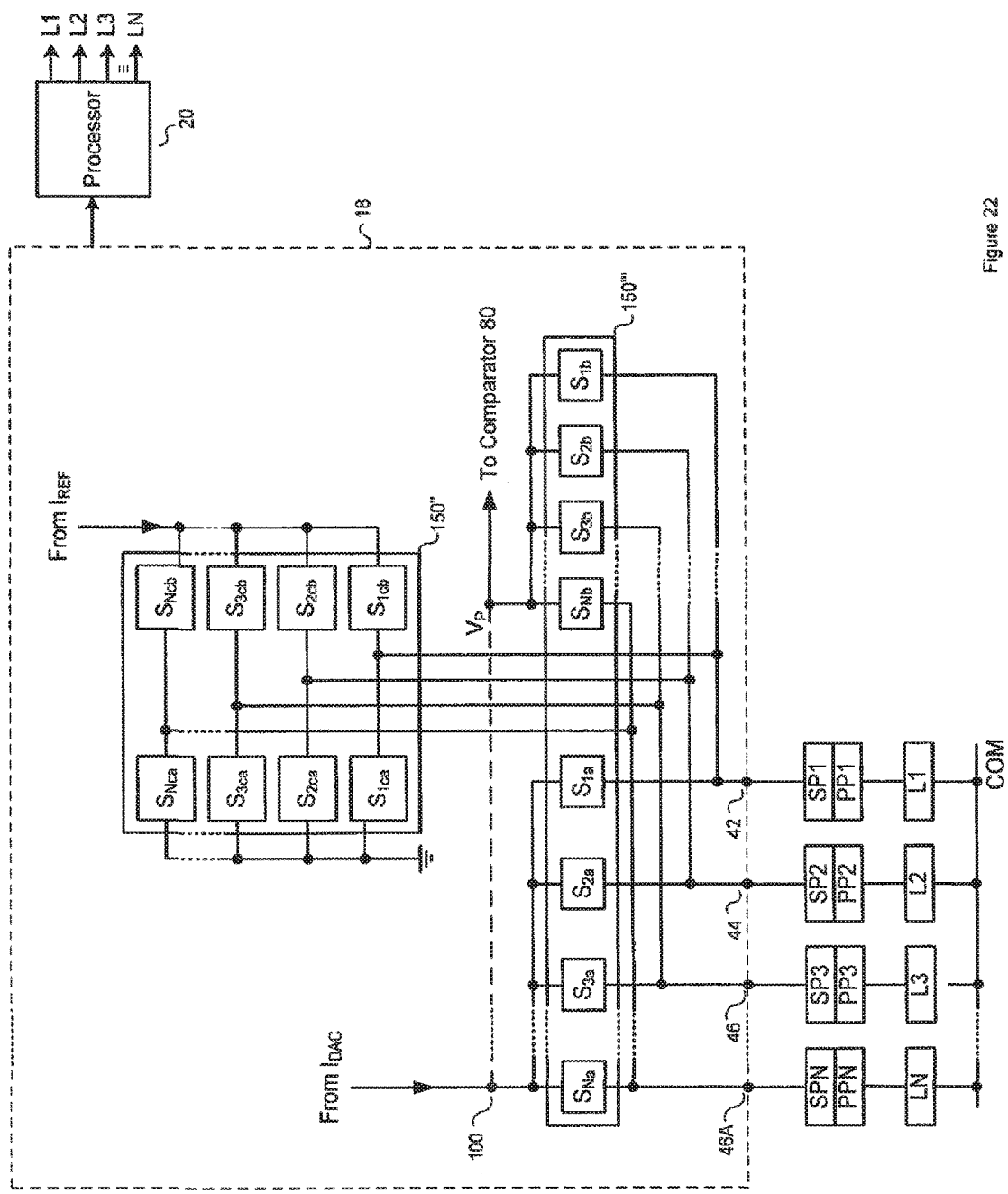
FIG. 22 is a further general illustration of a detection circuit in accordance with the invention.

FIG. 22 illustrates a further generalisation of the detector circuitry 18 shown in FIG. 21. In FIG. 22, more than four terminals 42, 44, 46, ..., 46A are present. Similarly, in this case, the jack socket has N poles SP1, SP2, SP3, ..., SPN (where N is typically greater than 4), for connection to corresponding poles PP1, PP2, PP3, ..., PPN on a jack plug, the poles of the jack plug being connected to load impedances L1, L2, L3, ..., LN respectively.

The detector circuitry 18 includes an additional network of switches 150''' comprising switches $S_{1a}$, $S_{2a}$, $S_{3a}$, ..., $S_{Na}$ that are connected to the terminals 42, 44, 46, ..., 46A respectively. The other poles of these switches are connected together at a node 100 and coupled to the first current source 60, for example the $I_{DAC}$, possibly via a limiting resistance $R_C$, as described above.

The first comparator input, i.e. voltage $V_P$, may also be connected to node 100, as illustrated by the dashed line. The comparator input node is also connected to the terminals 42, 44, 46, ..., 46A via the respective additional switches $S_{1b}$, $S_{2b}$, $S_{3b}$, .... $S_{Nb}$ of the switch network 150''' and these additional switches are switched, i.e. controlled, in the same way as the switches $S_{1a}$, $S_{2a}$, $S_{3a}$, ..., $S_{Na}$ respectively.

The reference current $I_{REF}$ can be connected to ground through any of the pairs of switches $S_{1ca}$, $S_{1cb}$; $S_{2ca}$, $S_{2cb}$; $S_{3ca}$, $S_{3cb}$; ..., $S_{Nca}$, $S_{Ncb}$ in the switching block 150''. The connection point of the switches $S_{1ca}$ and $S_{1cb}$ is connected to the terminal 42. The connection point of the switches $S_{2ca}$ and $S_{2cb}$ is connected to the terminal 44. The connection point of the switches $S_{3ca}$ and $S_{3cb}$ is connected to the terminal 46, and so on, with the connection point of the switches $S_{Nca}$ and $S_{Ncb}$ connected to the terminal 46A.

Again, by closing of the various switches in sequence, the circuit may be operated in the measurement modes described above.

The resulting circuit networks may be analysed by normal circuit analysis methods as above and the resulting CODE words appropriately interpreted, so that the processor 20 generates output signals indicating the values of the loads L1, L2, L3, ..., LN.

In all the embodiments above, the measured impedance is relative to a known value of resistors. These may be on-chip resistors, in which case there may be a wide manufacturing tolerance of say +/20%. These may be trimmed during manufacture to a known value. Preferably the processor includes a multiplier which multiplies the output code by a correction factor γ. This correction factor may be obtained during manufacturing test of the circuit or of the complete device, possibly based on the code initially obtained with known load impedance on one or more of the terminals. The correction factor may be stored on-chip in non-volatile memory, or may be stored in the processor or some other memory in the host electronic device.

There is thus provided a detection circuit that detects the properties of an accessory connected to an electronic device, and thereby allows the electronic device to be used with accessories having different numbers of transducers and/or different plug pole wiring to those transducers and to ground potential.

The skilled person will recognise that some aspects of the above-described apparatus and methods, for example the calculations performed by the processor may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. The word "amplify" can also mean "attenuate", i.e. decrease, as well as increase and vice versa and the word "add" can also mean "subtract", i.e. decrease, as well as increase and vice versa. Any reference numerals or labels in the claims shall not be construed so as to limit their scope.

The invention claimed is:

1. A method of detecting properties of an accessory removably connected to electronic circuitry via a multi-pole connector, the method comprising:
  applying a first current through components of the accessory connected to a first pair of poles of said multi-pole connector, such that a first voltage is generated at a first input of a comparator;
  applying a second current through components of the accessory connected to a second pair of poles of said multi-pole connector, such that a second voltage is generated at a second input of the comparator;

varying one of the first and second currents such that the first voltage and the second voltage have a predetermined relationship; and determining an impedance property of at least one of the components of the accessory from values of the first and second currents that produce the predetermined relationship between the first voltage and the second voltage.

2. The method as claimed in claim 1, wherein the predetermined relationship is such that said first voltage and said second voltage are substantially equal.

3. The method as claimed in claim 1, wherein the step of varying one of the first and second currents such that the first voltage and the second voltage have a predetermined relationship comprises varying at least one of the first and second currents in response to a digital control word.

4. The method as claimed in claim 1, wherein the step of varying one of the first and second currents such that the first voltage and the second voltage have a predetermined relationship comprises varying a controllable divider point of a resistor divider.

5. The method as claimed in claim 4, wherein first control logic is configured to vary said controllable divider point of said resistor divider.

6. The method as claimed in claim 3, wherein the method further comprises:
outputting an evaluation value that is based on the values of the first and second currents that produce the predetermined relationship between the first voltage and the second voltage.

7. The method as claimed in claim 6, wherein the evaluation value is said digital control word.

8. The method as claimed in claim 3, wherein said digital control word is adjustable.

9. The method as claimed in claim 8, wherein said comparator is configured to output a comparison signal, and said digital control word is adjusted in response to said comparison signal.

10. The method as claimed in claim 8, wherein second control logic is configured to adjust said digital control word.

11. The method as claimed in claim 10, wherein the step of applying the first current through components of the accessory connected to the first pair of poles of said multi-pole connector, such that the first voltage is generated at the first input of the comparator, comprises applying said first current across at least one element of a switch network, and wherein the step of applying the second current through components of the accessory connected to the second pair of poles of said multi-pole connector, such that the second voltage is generated at the second input of the comparator, comprises applying said second current across at least one element of said switch network.

12. The method as claimed in claim 11 wherein said second control logic is further configured to operatively control a state of the interconnections of said switch network.

13. The method as claimed in claim 12, wherein said switch network comprises:
a first switch connecting a first switch network terminal and a second switch network terminal, said first switch network terminal coupled to a reference potential, and said second switch network terminal coupled to one pole of said second pair of poles; and
a second switch connecting said second switch network terminal and a third switch network terminal, said third switch network terminal coupled such that said second current may be applied across the switch network.

14. The method as claimed in claim 13, wherein said control logic is configured to operatively control said state of the interconnections of said switch network such that one and only one of the first and second switches is closed at any time.

15. The method as claimed in claim 14, wherein the step of determining an impedance property of at least one of the components of the accessory from the values of the first and second currents that produce the predetermined relationship between the first voltage and the second voltage comprises:
setting said switch network to a first switch network state, and outputting a first evaluation value related to first values of the first and second currents that produce the predetermined relationship between the first voltage and the second voltage;
subsequently setting said switch network to a second switch network state that is different to said first switch network state, and outputting a second evaluation value related to second values of the first and second currents that produce the predetermined relationship between the first voltage and the second voltage; and
determining said impedance properties of components of the accessory based on the first and second evaluation values.

16. The method as claimed in claim 15, wherein the first and second output signals are first and second values of the digital control word.

17. The method as claimed in claim 14, wherein the step of determining an impedance property of at least one of the components of the accessory from the values of the first and second currents that produce the predetermined relationship between the first voltage and the second voltage comprises:
setting said switch network to a first switch network state and adjusting said digital control word until it reaches a first value at which the first voltage and the second voltage have said predetermined relationship;
subsequently setting said switch network to a second switch network state, that is different to said first switch network state, and adjusting said digital control word until it reaches a second value at which the first voltage and the second voltage have said predetermined relationship; and
determining an impedance property of at least one of the components of the accessory based on the first and second values of the digital control word.

18. The method as claimed in claim 1, wherein the method further comprises:
controlling the operation of the at least one of the components of the accessory based on the determined impedance properties of at least one of the components of the accessory.

19. A computer program product, comprising a tangible computer readable medium containing instructions for causing a processor to perform a method according to claim 1.

20. A method of detecting properties of an accessory removably connected to electronic circuitry via a multi-pole connector, the method comprising:
applying a first current through components of the accessory connected to a first pair of poles of said multi-pole connector, such that a first voltage is generated at a first input of a comparator;
applying a second current, such that a second voltage is generated at a second input of the comparator;

varying one of the first and second currents such that the first voltage and the second voltage have a predetermined relationship; and determining an impedance property of at least one of the components of the accessory from the values of the first and second currents that produce the predetermined relationship between the first voltage and the second voltage.

* * * * *

UNITED STATES PATENT AND TRADEMARK OFFICE
CERTIFICATE OF CORRECTION

PATENT NO. : 10,149,042 B2
APPLICATION NO. : 15/900324
DATED : December 4, 2018
INVENTOR(S) : Graeme MacKay and Andrew Bothwell Page 1 of 1

It is certified that error appears in the above-identified patent and that said Letters Patent is hereby corrected as shown below:

In the Specification

1. In Column 3, Line 36, delete "FIG. 12c" and insert -- FIG. 2d --, therefor.

2. In Column 10, Line 63, delete "$I_{RE}$" and insert -- $I_{REF}$ --, therefor.

In the Claims

3. In Column 23, Line 14, in Claim 3, delete "a predetermined" and insert -- the predetermined --, therefor.

4. In Column 23, Line 20, in Claim 4, delete "a predetermined" and insert -- the predetermined --, therefor.

Signed and Sealed this
Fifteenth Day of October, 2019

Andrei Iancu
*Director of the United States Patent and Trademark Office*